(12) United States Patent
Ogura et al.

(10) Patent No.: US 7,841,088 B2
(45) Date of Patent: Nov. 30, 2010

(54) METHOD OF PRODUCING A SUSPENSION COIL SPRING

(75) Inventors: Junji Ogura, Tokyo (JP); Yukihiro Sugimoto, Tokyo (JP); Masahiko Shimizu, Tokyo (JP)

(73) Assignee: Mitsubishi Steel Mfg. Co., Ltd., Chuo-Ku, Tokyo (JP)

( * ) Notice: Subject to any disclaimer, the term of this patent is extended or adjusted under 35 U.S.C. 154(b) by 146 days.

(21) Appl. No.: 12/394,097

(22) Filed: Feb. 27, 2009

(65) Prior Publication Data
US 2009/0172946 A1 Jul. 9, 2009

Related U.S. Application Data

(62) Division of application No. 10/474,590, filed on Feb. 25, 2004.

(51) Int. Cl.
*B21F 35/00* (2006.01)
*F16F 1/06* (2006.01)
(52) U.S. Cl. ............... 29/896.91; 29/896.9; 29/896.93; 29/407.01; 29/407.09; 267/180; 267/187; 267/188; 267/248; 267/267; 267/286
(58) Field of Classification Search ............... 29/896.9, 29/896.91, 896.93, 407.01, 407.05, 407.07, 29/407.09, 407.1; 267/180, 187, 188, 248, 267/267, 286
See application file for complete search history.

(56) References Cited

U.S. PATENT DOCUMENTS 4,903,985 A 2/1990 Muhr et al.
5,442,945 A 8/1995 Vondracek
6,199,882 B1 3/2001 Imaizumi et al.

(Continued)

FOREIGN PATENT DOCUMENTS

DE 3519369 C1 7/1986

(Continued)

OTHER PUBLICATIONS

European Search Report, EP Appl. No. EP09016005, Dated Aug. 11, 2010, Completed Aug. 4, 2010, Munich, Germany.

(Continued)

*Primary Examiner*—David P Bryant
*Assistant Examiner*—Ryan J Walters
(74) *Attorney, Agent, or Firm*—Fay Sharpe LLP

(57) ABSTRACT

A suspension coil spring, when assembled to a suspension device, in which a spring reaction axis is positioned coincident with or sufficiently close to a load input axis, and the design and manufacture of coil springs are facilitated. Namely, A suspension coil spring (19) in a free state is formed so that a coil axis (AC) is bent in V-shape at bend point (PB) and the distance from the end turn center (CU) of the upper seating surface (38) to an imaginary coil axis (AI) is an upper inclination amount ($V_U$), and the distance from the end turn center (CL) to the imaginary coil axis (AI) is a lower inclination amount ($V_L$). When the suspension coil spring (10) is interposed between spring seats (22, 24) in the suspension device and compress along a strut axis, the spring reaction axis of the suspension coil spring (10) is inclined and offset with respect to the imaginary coil axis (AI) according to the inclination amounts ($V_U$, $V_L$).

3 Claims, 21 Drawing Sheets

U.S. PATENT DOCUMENTS

| | | |
|---|---|---|
| 6,328,290 B1 | 12/2001 | Imaizumi et al. |
| 6,375,174 B2 | 4/2002 | Hasegawa et al. |
| 6,460,840 B2 | 10/2002 | Imaizumi et al. |
| 2002/0046587 A1* | 4/2002 | Hasegawa .................... 72/138 |
| 2003/0116219 A1* | 6/2003 | Hasegawa et al. ............. 140/89 |
| 2004/0169322 A1* | 9/2004 | Ogura et al. ................ 267/180 |

FOREIGN PATENT DOCUMENTS

| | | |
|---|---|---|
| DE | 4224962 C1 | 10/1993 |
| EP | 0526689 A | 2/1993 |
| EP | 976590 A1 | 2/2000 |
| EP | 1260390 A2 | 11/2002 |
| EP | 976590 B1 | 6/2003 |
| FR | 2670437 A | 6/1992 |
| GB | 1192766 A | 5/1970 |
| GB | 1198713 A | 7/1970 |
| JP | 46-27285 | 9/1971 |
| JP | 8332823 A | 12/1996 |
| JP | 2000-104772 A | 4/2000 |
| WO | 0006401 | 2/2000 |

OTHER PUBLICATIONS

European Search Report, Application No. EP 02718562; Date of completion of search Jan. 12, 2006.

International Search Report, PCT/ISA/210; mailing date Jul. 23, 2002; ISA/Japanese Patent Office.

* cited by examiner

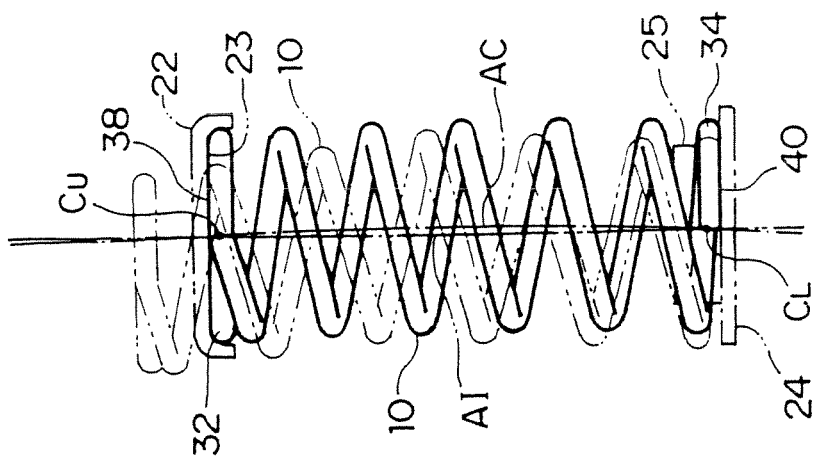
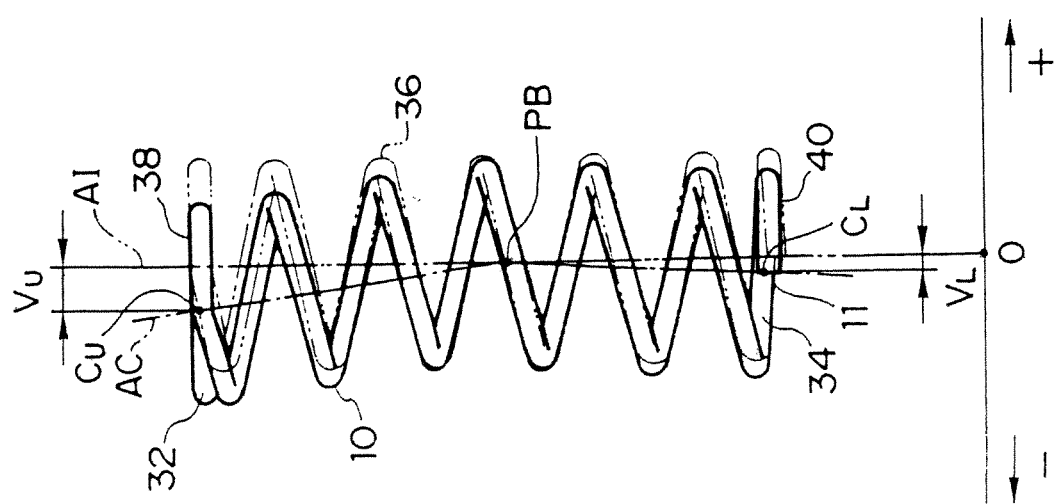

PB=2.250 (TURN)

PB=2.750 (TURN)

PB=3.250 (TURN)

PB=3.750 (TURN)

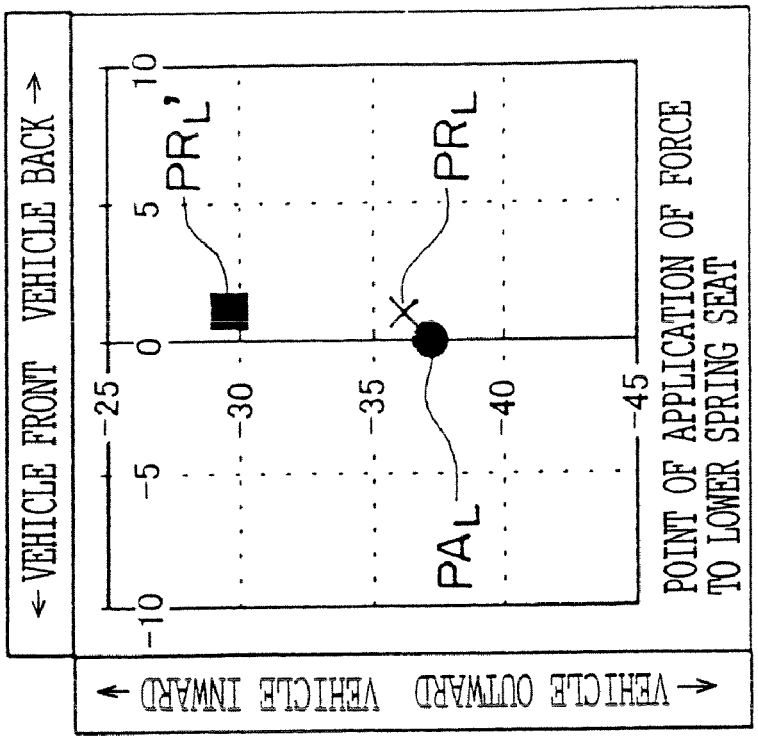
FIG. IIA
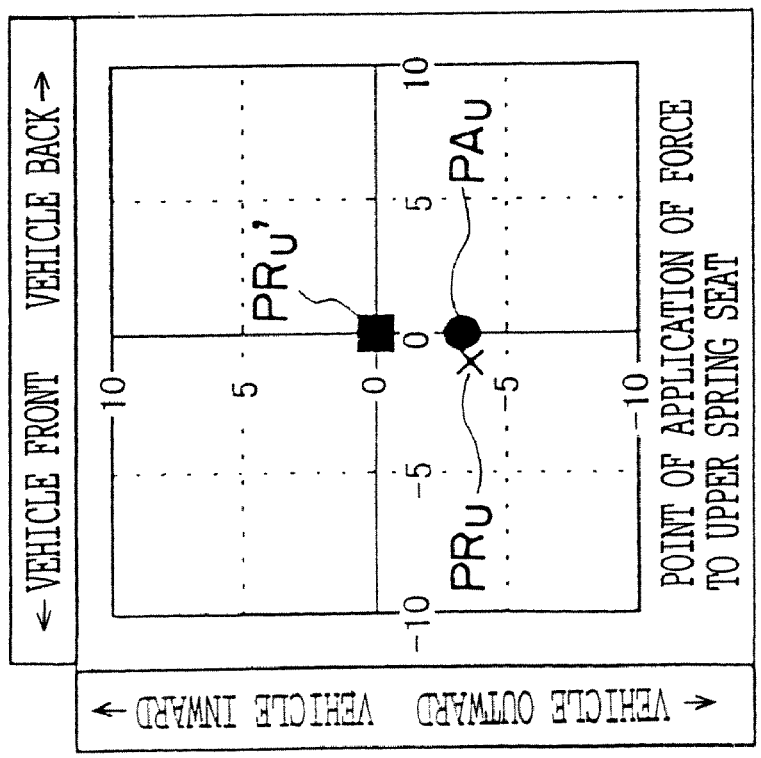
FIG. IIB
PB=4.250 (TURN)

PRIOR ART $P_U$: INTERSECTION OF UPPER SEATING SURFACE AND LOAD AXIS $P_L$: INTERSECTION OF LOWER SEATING SURFACE AND LOAD AXIS $Y_U$: Y COORDINATE OF POINT $P_U$ $Y_L$: Y COORDINATE OF POINT $P_L$ $V_U V_L$ PLANE (PROJECT PLANE)

$V_U < 0$ 10A
PB
$V_L < 0$ $V_U = 0$ 10D
PB
$V_L < 0$ $V_U > 0$ 10G
PB
$V_L < 0$ $V_U < 0$ 10B
PB
$V_L = 0$ $V_U = 0$ 10E
PB
$V_L = 0$ $V_U > 0$ 10H
PB
$V_L = 0$ $V_U < 0$ 10C
PB
$V_L > 0$ $V_U = 0$ 10F
PB
$V_L > 0$ $V_U > 0$ 10F
PB
$V_L > 0$

METHOD OF PRODUCING A SUSPENSION COIL SPRING

This application is a divisional of U.S. patent application Ser. No. 10/474,590, filed Feb. 25, 2004, and incorporated herein in its entirety by reference.

BACKGROUND OF THE INVENTION

1. Field of the Invention

The present invention relates to a suspension coil spring which is employed for a suspension device for a vehicle such as an automobile, and more particularly, to a suspension coil spring which is suitably applicable to a strut-type suspension device.

2. Background Art

In recent years, a strut-type suspension device which is widely used as a suspension device for a vehicle is of a type in which a shock absorber is used as a positioning support (i.e., strut) with respect to a wheel. The shock absorber as a strut comprises a cylinder, a rod which is slidably supported by the cylinder, and a compressive coil spring which is disposed at an outer circumferential side of the rod. In this strut-type suspension device, an upper end portion of the rod is connected to a vehicle body via a strut mount or the like, and a lower end portion of the cylinder is rigidly connected to a knuckle which supports a wheel rotatably. Here, the knuckle is pivotally connected to the vehicle body via a lower arm. Further, the compressive coil spring (simply referred to as a "coil spring", hereinafter) is placed between an upper spring seat, which is fixed at a vehicle body side, and a lower spring seat, which is fixed at an outer circumferential surface of the cylinder, so as to be in a compressed state, and then supported at an outer circumferential side of the rod.

As compared to other separate-type suspension devices, the strut-type suspension device as described above has merits that the required number of parts is reduced, the required structure is less complicated, and the required space for installation is small. However, since a strut axis and a load-input axis (axis that connects a road holding point of a tire and an upper mount point of a strut) are displaced from each other, a bending moment occurs at the strut. The bending moment causes a force forcibly acting against another force to a piston and a bushing which form a sliding section of the shock absorber. Accordingly, a frictional amount of the rod increases thereby causing smooth operation of the shock absorber to be hindered, whereby a vehicle riding quality is deteriorated. At present, in order to lessen the occurrence of such a bending moment as described above, there have been proposed a method in which the coil spring is mounted to the suspension device so as to be offset from the strut axis to thereby cancel the bending moment and a method in which a sliding surface of a bearing portion or a piston portion in the strut is made from a low frictional material.

However, in the strut-type suspension device, sine the larger the tire widths of a vehicle, the more outwardly the road holding point of the tire moves, it actually becomes impossible to offset the coil spring so as to position an operating line of a spring reaction force (spring reaction axis) coincident with or sufficiently close to the load input axis. Meanwhile, even when the tire width of the vehicle is not so large, in order to prevent the coil spring from interacting with the vehicle body, it is preferable that an offset amount of the coil spring is small.

From the aforementioned viewpoints, for example, Japanese Patent Application (JP-A) Laid-Open No. 2000-104772 discloses a suspension coil spring in which a compressive coil spring whose coil axis in a free state is substantially bent at a predetermined curvature, and a pitch of each of a lower end turn portion and an upper end turn of the spring coil spring is set such that at least one of a lower seating surface and an upper seating surface which are respectively seated on an upper seat and a lower seat of a suspension device, is inclined in a predetermined direction and at a predetermined angle with respect to the lower seat and the upper seat. In accordance with this suspension coil spring, an inclination and a vehicle width directional position of a spring reaction axis can be controlled by controlling the inclination of the lower seating surface or the upper seating surface of the suspension coil spring with respect to the lower seat or the upper seat or a bending amount (shell-bending amount) of the coil axis. Consequently, without requiring an increase of an offset of the coil spring with respect to a strut axis, the spring reaction axis of the suspension coil spring can be positioned coincident with or sufficiently close to the load input axis, thus making it possible to decrease the frictional amount of a shock absorber, and facilitate the operation of the shock absorber. In other words, by controlling the inclination and the shell-bending amount of the lower seating surface or the upper seating surface, respectively, a transverse reaction force is caused by the coil spring. A moment due to the transverse reaction force is made to resist a bending moment of a strut. Accordingly, the transverse reaction force that acts on a sliding section, which comprises a piston, a bushing or the like in the shock absorber, can be mitigated. Further, by controlling a position of the spring reaction axis of the coil spring so as to pass through the center of an upper mount (strut mount), occurrence of friction due to a force forcibly acting against another force at the bearing portion can effectively be prevented. Accordingly, steering performance can be improved.

However, in designing the suspension coil spring disclosed in JP-A No. 2000-104772, since extra shell bending amount and extra end turn pitch which may affect spring characteristics are added as design parameters, a problem is caused in that the design of the coil spring becomes complicated. Further, since an end turn pitch i.e., a degree and a direction of the inclination of each seating surface of the coil spring affects a magnitude and a direction of the transverse reaction force quite sensitively, the coil spring must be manufactured with a considerably high dimensional accuracy. For example, even when a degree or direction of the inclination of the seating surface is slightly different from a design target value of the coil spring, a possibility may occur that required spring characteristics cannot be obtained. For this reason, extra equipment is also required for equipment for manufacturing the coil spring in order to provide the coil spring with a high dimensional accuracy, or extra production management during a manufacturing process of the coil spring. Consequently, a problem is caused in that a manufacturing cost of the coil spring becomes extremely high.

Characteristics of the suspension coil spring as described above is ordinarily analyzed by a non-linear analysis using a finite element method, and on the basis of the results of the analysis, the suspension coil spring is designed. In other words, as long as modeling is performed, characteristics that are newly required, of the suspension coil spring can be analyzed by using finite element codes in general use. However, in the analysis by the finite element method (FEM analysis), spring characteristics can be obtained by inputting spring data and boundary conditions; however, inversely, spring data for satisfying the characteristics that is required by a designer of the suspension coil spring cannot be determined. Accordingly, a repetitive calculation must be done while the spring data is being varied until the results of the analysis which suffices target characteristics can be obtained.

On the basis of a flow chart which is shown in FIG. 13, a specific description will be made of a method of designing the suspension coil spring using the finite element method. First, in step 300, a size and a shape of the suspension coil spring are respectively presumed. Thereafter, in steps 302 to 306, the FEM analysis is performed by combining the presumed size and shape, and boundary conditions. Then, it is determined whether or not results of the analysis satisfy the desired characteristics. At this time, if the results of the analysis satisfy the required characteristics, the size and shape of the suspension coil spring will be determined on the basis of the analysis results. On the other hand, if the results of the analysis do not satisfy the required characteristics, operation returns to step 300, where a repetitive calculation is carried out, during which presumable size and/or shape of the suspension coil spring are varied until the results that satisfy the required characteristics are obtained. However, when the suspension coil spring is designed by using the above-described designing method, there is no way but relying upon the designer's perception or experiences in presuming the size and shape of the suspension coil spring. Accordingly, a problem is caused in that it depends on the degree of skill of the designer of the suspension coil spring whether or not an optimal solution can be figured out.

In view of the aforementioned facts, an object of the invention is to provide a suspension coil spring in which, with the suspension coil spring assembled to a suspension device, a spring reaction axis can be positioned coincident with or sufficiently close to a load input axis, and the design and manufacture of the coil spring is facilitated.

SUMMARY OF THE INVENTION

In order to attain the aforementioned objects, a suspension coil spring of the present invention is in a free state and is formed such that a coil axis is bent in a V shape at a bent point which is a portion that corresponds to a turn from a spring terminal to R turn (R is a positive real number), presuming that a bending angle at the bending point is 0°, at least one of a center of an upper end turn portion and a center of a lower end turn portion is made eccentric in a predetermined eccentric amount in a predetermined eccentric direction, with respect to an imaginary coil axis, and in a state in which the suspension coil spring is interposed between the upper seat and the lower seat in the suspension device, and compressed along a strut axis, the eccentric direction and the eccentric amount of each center of the upper end turn portion and the lower end turn portion with respect to the imaginary coil axis are set so as to position a spring reaction axis in the suspension device sufficiently close to a load input axis.

The suspension coil spring having the above-described structure is interposed between the upper seat and the lower seat of the suspension device and compressed along the strut axis, whereby both a compressive reaction force and a transverse reaction force are generated, and an operating line (spring reaction axis) of a spring reaction force which is a composite force of the compressive reaction force and the transverse reaction force is inclined with respect to the imaginary force. Further, the suspension coil spring is elastically deformed non-symmetrically with respect to the imaginary coil axis, whereby the spring reaction axis is deviated from the imaginary coil axis.

Consequently, the spring reaction spring in which the spring reaction axis is positioned coincident with or sufficiently close to the load input axis and an upper mount can be designed merely by adding new design parameters comprising a distance from the center of the upper end turn portion of the suspension coil spring to the imaginary coil axis (upper eccentric amount), a distance from the center of the lower end turn portion to the imaginary coil axis (lower eccentric amount), and an eccentric direction in which the upper end turn portion and the lower end turn portion are respectively made eccentric, to the required design parameters for a coil spring (reference coil spring) whose imaginary coil axis is used as a coil axis.

BRIEF DESCRIPTION OF THE DRAWINGS

FIGS. 1A and 1B are side views each showing a suspension coil spring according to an embodiment of the present invention showing a free state of the suspension coil spring, and a compressed state thereof, when assembled to a suspension device;

FIGS. 11A and 11B are coordinates each showing points of application of force on an upper spring seat and a lower spring seat of the suspension coil spring according to Example 1 of the present invention;

DESCRIPTION OF THE PREFERRED EMBODIMENTS

With reference to drawings, a description of a coil spring according to an embodiment of the present invention and a manufacturing method thereof will be made hereinafter.

Structure and Operation of a Suspension Coil Spring

FIGS. 1A and 1B respectively show an example of a suspension coil spring according to an embodiment of the present invention. The suspension coil spring 10 is applied to a strut-type suspension device 12 in a vehicle shown in FIG. 2. Further, in FIG. 2, portions other than a supporting portion of an upper end portion of the suspension coil spring 10 are shown by a double-dashed line.

Figure 2:
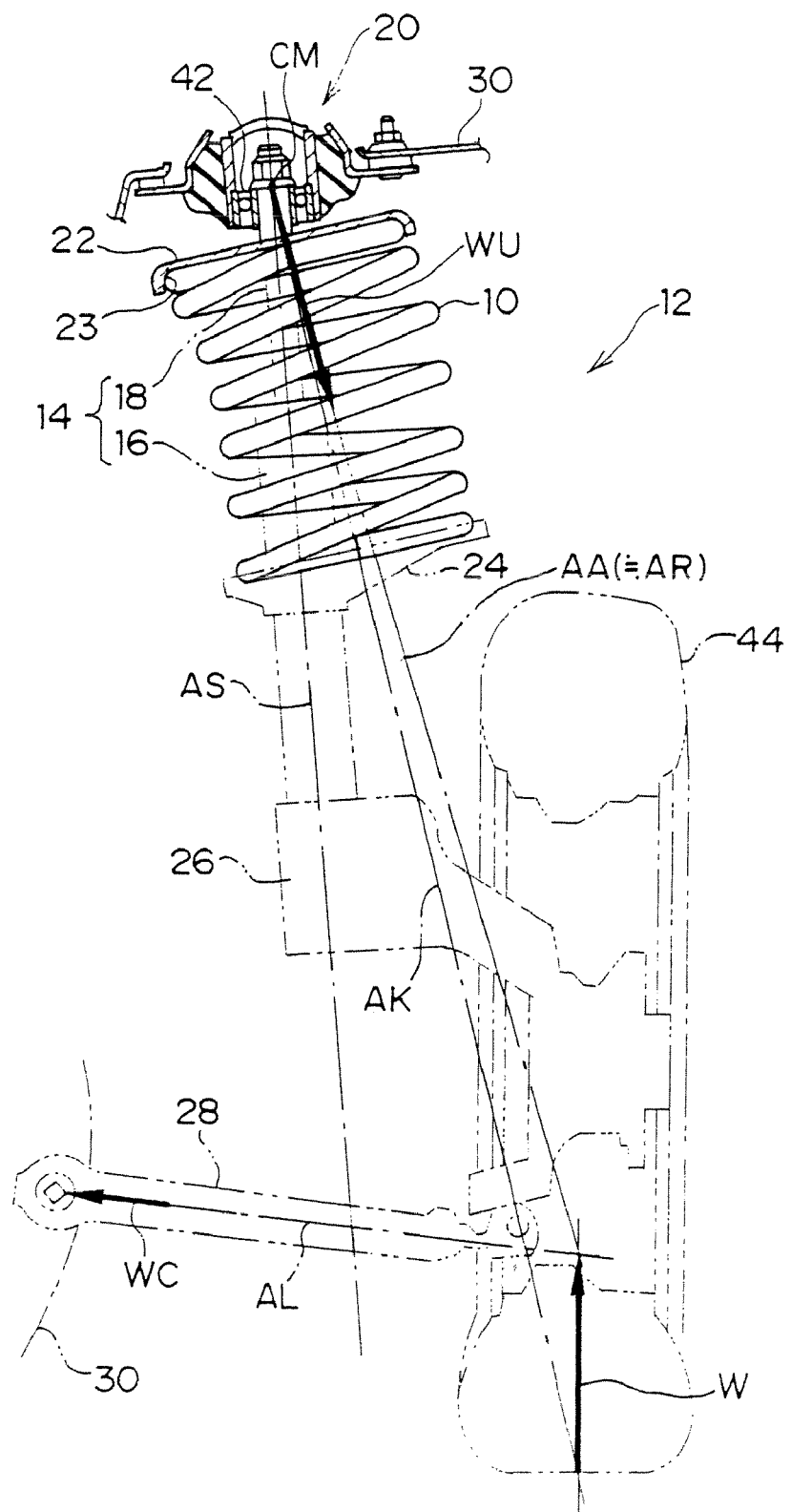
FIG. 2 is a side view of a structure of a strut-type suspension device with the suspension coil spring according to the present embodiment assembled thereto.

First, a structure of the suspension device 12 according to the present embodiment will be explained, hereinafter. As shown in FIG. 2, the suspension device 12 is provided with a shock absorber 14 as a support (strut) for positioning a wheel. The shock absorber 14 comprises a cylinder 16 containing therein a fluid such as a gas or an oil, and a rod 18 which is connected to a piston (not shown) which is slidably disposed inside the cylinder 16, and which protrudes upwardly from the cylinder 16.

In the suspension device 12, an upper end portion of the rod 18 is elastically connected to a vehicle body 30 of a vehicle via a strut mount 20. A spring seat 22 as an upper seat is fixed to the rod 18 at an upper end side thereof, and a spring seat 24 as a lower seat is fixed to an intermediate portion of the cylinder 16. The suspension coil spring 10 is supported by the shock absorber 14 at an outer circumferential side thereof. The suspension coil spring 10 is placed between the spring seat 22 and the spring seat 24 of the shock absorber 14 and compressed along a central axis (strut axis AS) of the shock absorber 14. Further, a lower end portion of the shock absorber 14 is rigidly connected to a knuckle 26 which supports rotatably a wheel 44 comprising a tire and a wheel. The knuckle 26 is pivotally connected to the vehicle body 30 of a vehicle via a lower arm 28. Accordingly, the wheel 44 which is axially supported by the knuckle 26 is supported by the vehicle body 30 via the shock absorber 14 and the suspension coil spring 10, and is also supported by the vehicle body 30 via the lower arm 28.

A structure of the suspension coil spring 10 will be explained, hereinafter. As shown in FIG. 1A, the suspension coil spring 10 in a free state is formed such that a coil axis AC is bent in a V shape at a position which corresponds to a portion from a lower spring terminal 11 to R turn, as a bending point PB. Further, in FIG. 1A, if a bending angle at the bending point PB is 0°, a straight line AI indicated by a double-dashed line is an imaginary coil axis. A lead angle of each of an upper end turn portion 32 and a lower end turn portion 34 is set such that an upper seating surface 38 and a lower seating surface 40 of the suspension coil spring 10 respectively form a plane which intersects perpendicularly or inclined at a predetermined angle with respect to the imaginary coil AI.

The suspension coil spring 10 of the present embodiment is designed on the basis of a reference coil spring 36 (see FIG. 1A) whose imaginary coil AI is used as a coil axis. Accordingly, when the suspension coil spring 10 of the present embodiment is designed, fundamental parameters, which comprise an upper eccentric amount $V_U$ and a lower eccentric amount $V_L$, and an eccentric direction in which the upper end turn portion 32 and the lower end turn portion 34 are respectively made eccentric can merely be added to the required design parameters for designing the reference coil spring 36.

As shown in FIG. 1A, the upper eccentric amount $V_U$ is defined by a distance from the end turn center $C_U$ of the upper end turn portion 32 to the imaginary coil axis AI, and the lower eccentric amount $V_L$ is defined by a distance from the end turn center $C_L$ of the lower end turn portion 34 to the imaginary coil AI. Namely, by considering the position of the imaginary coil AI as an original point of a coordinate axis, the upper eccentric amount $V_U$ and the lower eccentric amount $V_L$ are respectively a point on a coordinate axis that intersects perpendicularly to the imaginary coil AI. The following description will be made presuming that this coordinate axis is a linear axis substantially parallel to a transverse direction of the vehicle body 30, a positive direction of the coordinate axis corresponds to an outward direction of the transverse direction of the vehicle body 30, and a negative direction of the coordinate axis corresponds to an inward direction of the vehicle transverse direction of the vehicle body 30. However, the coordinate axis which is shown in FIG. 1A is not necessarily in parallel to the transverse direction of the vehicle body 30. In many cases, in accordance with the structure of the suspension device 12, the coordinate axis is slightly inclined with respect to the transverse direction of the vehicle body 30.

Besides the upper eccentric amount $V_U$ and the lower eccentric amount $V_L$, as a matter of course, the bending point PB can also be a design parameter. However, the bending point PB is a parameter that is defined by a relationship between the upper eccentric amount $V_U$ and the lower eccentric amount $V_L$, and is then set to an arbitrary value within a range enough to satisfy the relationship between the upper eccentric amount $V_U$ and the lower eccentric amount $V_L$. However, when the bending point PB is varied, stress distribution of the suspension coil spring 10 varies in accordance with a load applied to the suspension coil spring 10 during a vehicle traveling time. Therefore, it is necessary to analyze such stress distribution beforehand, and then select and determine the bending point PB at which stress can be uniformly distributed as much as possible or at which occurrence of stress concentration can be prevented as much as possible.

FIG. 1B shows the suspension coil spring 10 when it is assembled to the suspension device 12 by a solid line, and the suspension coil spring 10 in a free state by a double-dashed line. As described above, the suspension coil spring 10 assembled to the suspension device 12 is interposed between the spring seat 22 and the spring seat 24 and then set in a compressed state. Here, each of the spring seats 22 and 24 is formed into a substantially disc shape. Further, at a bottom surface side of the spring seat 22, there is provided a ribbed engaging portion 23 which press-contacts with the upper seating surface 38 of the suspension coil spring 10 in the compressed state, and forcibly positions the upper end turn portion 32 at a predetermined position in a direction perpendicular to the coil axis. At a top surface side of the spring seat 24, there is provided a cylindrical engaging portion 25 which press-contacts with the lower seating surface 40 of the suspension coil spring 10 in the compressed state, and forcibly positions the lower end turn portion 34 at a predetermined position in the direction perpendicular to the coil axis.

As shown in FIG. 1B, the spring seats 22 and 24 compress the suspension coil spring 10 along the strut axis AS without changing the inclination of each of the upper seating surface 38 and the lower seating surface 40 with respect to the imaginary coil AI before and after the compression. At this time, the seating surfaces 38 and 40 of the suspension coil spring 10 are disposed parallel to the spring seat 22 at the bottom surface side thereof and the spring seat 24 at the top surface side thereof, respectively. The spring seats 22 and 24 force the end turn center $C_U$ of the upper end turn portion 32 and the end turn center $C_L$ of the lower end turn portion 34 to be positioned respectively coincident with the imaginary coil AI by the engaging portions 23 and 25. Consequently, the suspension coil spring 10, which is interposed between the spring seat 22 and the spring seat 24, deforms elastically along a direction in which the coil axis AC flexes, and the coil axis AC forms a curve whose axial central portion is slightly expanded outwardly of the vehicle body 30 with respect to the imaginary coil AI.

As described above, the suspension coil spring 10 is elastically deformed between the spring seats 22 and 24 in a compressed direction and a flexed direction to thereby apply a compressive reaction force and a transverse reaction force to the spring seats 22 and 24. At this time, a spring reaction force from the suspension coil spring 10 can be regarded as a composite force of the compressive reaction force and the transverse reaction force. Further, a magnitude of the transverse reaction force, which is applied from the suspension coil spring 10 to the spring seats 22 and 24, can be determined by appropriately setting the upper eccentric amount $V_U$ and the lower eccentric amount $V_L$, and a direction of the transverse reaction force can also be determined in one of a positive direction and a negative direction on the coordinate axis (see FIG. 1A). Consequently, by appropriately setting the magnitude of each of the upper eccentric amount $V_U$ and the lower eccentric amount $V_L$, an inclination of a spring reaction axis as an operating line of a spring reaction force acting from the suspension coil spring 10 to the imaginary coil AI can be controlled.

Further, the suspension coil spring 10 elastically deforms in non-symmetric with respect to the imaginary coil AI between the spring seats 22 and 24. Accordingly, the spring reaction axis is deviated along the coordinate axis with respect to the imaginary coil AI as a center. Consequently, by appropriately determining magnitudes of the upper eccentric amount $V_U$ and the lower eccentric amount $V_L$, respectively, an inclination, and a position with respect to the coordinate axis, of the spring reaction axis as the operating line of the spring reaction force from the suspension coil spring 10 to the imaginary coil AI can be controlled.

A description of a load which acts on the strut-type suspension device 12 that is shown in FIG. 2 will be made hereinafter. In FIG. 2, AS is the strut axis which is a central axis of the shock absorber 14, AK is a king pin axis which is a steering central axis of the wheel 44, and $A_L$ is a lower arm axis which is a central axis of the lower arm 28, and AA is a load input axis which is applied from a road surface to the shock absorber 14.

Figure 3A:
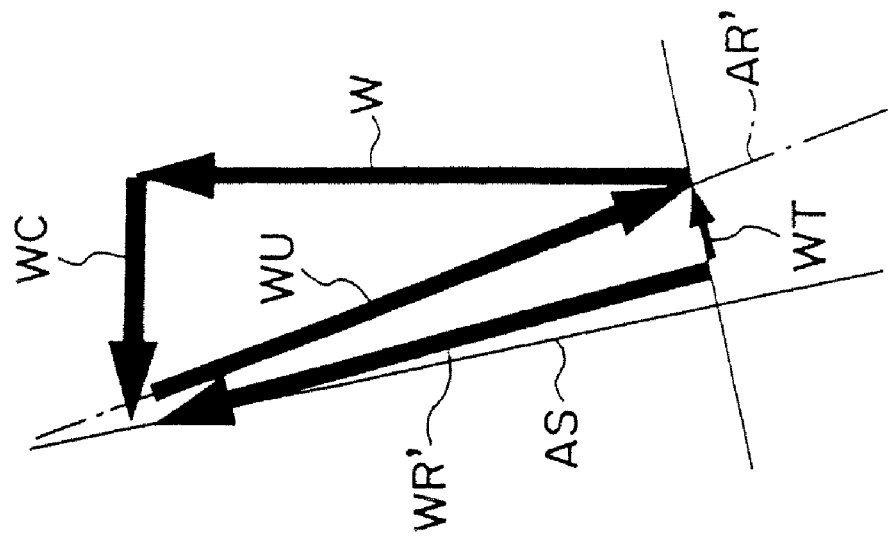
FIGS. 3A and 3B are explanatory views each showing a relationship among a road surface reaction force, a load axial force, and a lower arm axial force in the suspension device shown in FIG. 2.

As shown in FIG. 2, first, a road surface reaction force W acts from a road surface to the suspension coil spring 12 along a line perpendicular to the center of the wheel 44. Further, in order to resist the road surface reaction force W, a load axial force $W_U$ from an upper end of the shock absorber 14 acts on the suspension coil spring 12 along the load input axis M, and a lower arm axial force WC that is a composite force of the road surface reaction force W and the load axial force $W_U$ acts on a proximal portion of the lower arm 28 along the lower arm axis $A_L$. As shown in FIG. 3A, the road surface reaction force W, the load axial force $W_U$, and lower arm axial force WC configure a triangle of force as shown in FIG. 3A, and then, the suspension coil spring 10 generates a spring reaction force WR. On the other hand, FIG. 3B shows the road surface reaction force W, the load axial force $W_U$, and the lower arm axial force WC, and a spring reaction force WR' generated by a reference coil spring 36 when it is assembled to the suspension device 12 in order to compare the reference coil spring 36 with the suspension coil spring 10.

Figure 3B:
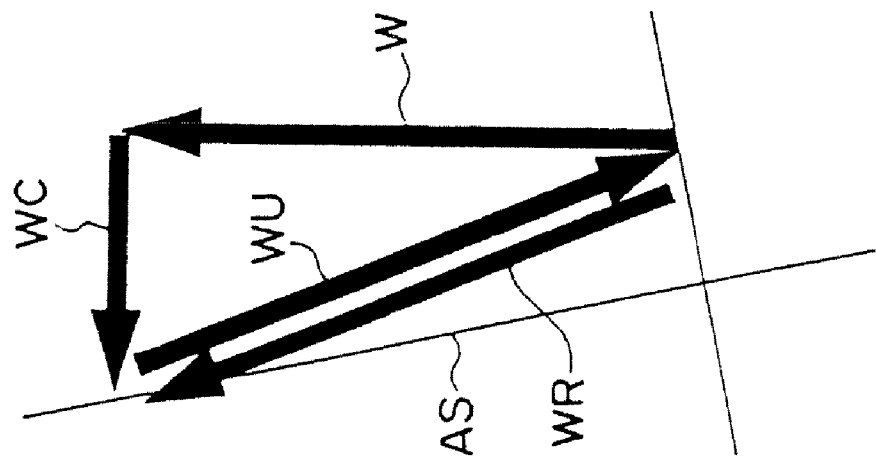

A spring reaction axis AR' of the reference coil spring 36 is substantially coincident with the imaginary coil AI, and when the reference coil spring 36 cannot be sufficiently offset from the strut axis AS, as shown in FIG. 3B, the spring reaction axis AR' is not parallel to the load input axis AA as the operating line of the load axial force $W_U$. Therefore, the spring reaction axis AR' does not pass through a mount central point CM of a strut mount 20 which an upper end portion of the rod 18 connects. Accordingly, in a case in which the reference coil spring 36 is used, a transverse force WT is generated, and the transverse force WT acts on the shock absorber 14 as a bending moment. Due to the bending moment, a force forcibly acting against another force occurs at the sliding section such as the piston or the bushing (not shown) of the shock absorber 14 thereby increasing friction of the rod 18. Further, as in the case in which the reference coil spring 36 is used, if the spring reaction axis AR' does not pass through the mount central point CM of the strut mount 20 (see FIG. 2) which the upper end portion of the rod 18 connects, a force forcibly acting against another force occurs at the strut mount 20. Consequently, a friction of a bearing portion 42 at the strut mount 20 increases thereby deteriorating a steering performance of a vehicle.

On the other hand, in the suspension coil spring 10 of the present embodiment, in a state in which the suspension coil spring 10 is assembled to the suspension device 12, each of the upper eccentric amount $V_U$, the lower eccentric amount $V_L$, and the eccentric directions are appropriately determined such that the spring reaction axis AR as the operating line of the spring reaction force WR of the suspension coil spring 10 is in parallel with the load input axis AA, and the spring reaction axis AR passes through the mount central point CM of the strut mount 20. Thus, as shown in FIG. 3A, the use of the suspension coil spring 10 can prevent the occurrence of the transverse force acting on the shock absorber 14 as well as the occurrence of the force forcibly acting on the normal force at the sliding section of the shock absorber 14. Further, since the spring reaction axis AR passes through the mount central point CM of the strut mount 20, the force forcibly acting on the normal force does not occur at the strut mount 20, the deterioration of the steering performance of the vehicle due to the increase of friction at the bearing portion 42 of the strut mount 20 (see FIG. 2) can be prevented.

In accordance with the above-described suspension coil spring 10 of the present embodiment, the suspension coil spring 10 is interposed between the spring seat 22 and the spring seat 24 in the strut-type suspension device 12, and then compressed along the strut axis AS. The suspension coil spring 10 is elastically deformed in a direction in which the coil axis AC flexes such that the end turn center $C_U$ of the upper end turn portion 32 and the end turn center $C_L$ of the lower end turn portion 34 are positioned close to the imaginary coil AI. Accordingly, the compressive reaction force and the transverse force are generated by the suspension coil spring 10 thereby causing the spring reaction axis AR as the operating line of the composite force WR of the transverse force and the compressive force to incline with respect to the imaginary coil AI. Further, since the suspension coil spring 10 elastically deforms in non-symmetric with the imaginary coil AI, the spring reaction axis AR deviates along the transverse direction of the vehicle body 30.

In the suspension coil sprint 10, since the inclination and the position of the spring reaction axis AR can be controlled by the upper eccentric amount $V_U$, the lower eccentric amount $V_L$, and the eccentric directions, it becomes unnecessary to use the inclinations of the upper seating surface 38 and the lower seating surface 40 as parameters for designing the suspension coil spring 10. Consequently, merely by adding new design parameters comprising the upper eccentric amount $V_U$, the lower eccentric amount $V_L$, and the eccentric directions, to the design parameters of the reference coil spring 36 whose imaginary coil AI is used as the coil axis, the suspension coil spring 10 in which the spring reaction axis AR is positioned coincident with or sufficiently close to both the load input axis AA and the upper mount center CM can be designed.

With reference to FIGS. 4A to 4F, and FIGS. 5A to 5C, variant examples of the suspension coil spring according to the present embodiment will be explained hereinafter.

Figure 4A:
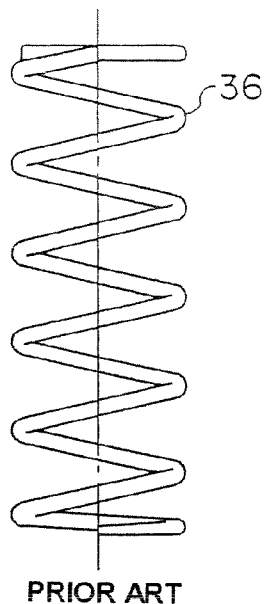
FIGS. 4A to 4F are side views each showing a suspension coil spring in which an upper eccentric amount $V_U$ and a lower eccentric amount $V_L$ are different from those of the suspension coil springs of FIGS. 1A and 1B.
Figure 4B:
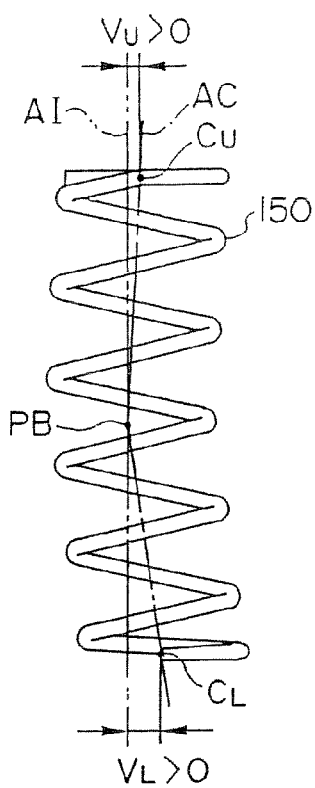
Figure 4C:
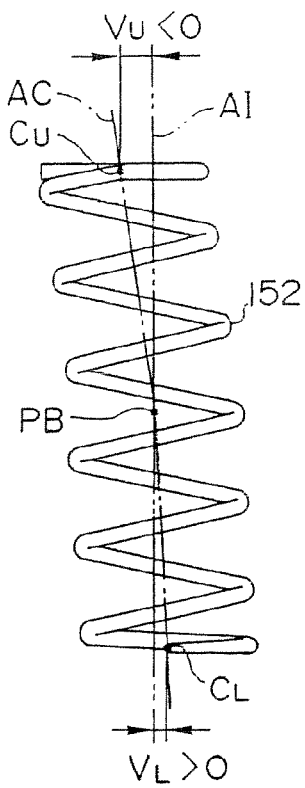
Figure 4D:
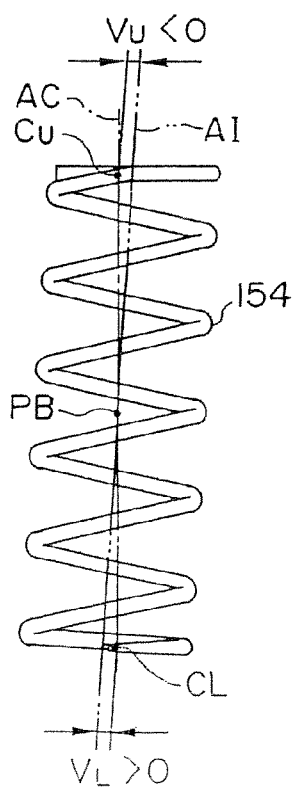
Figure 4E:
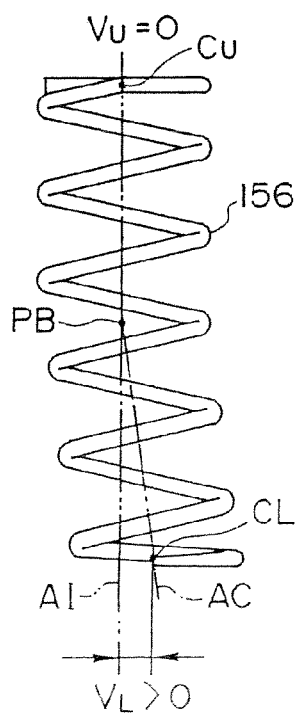
Figure 4F:
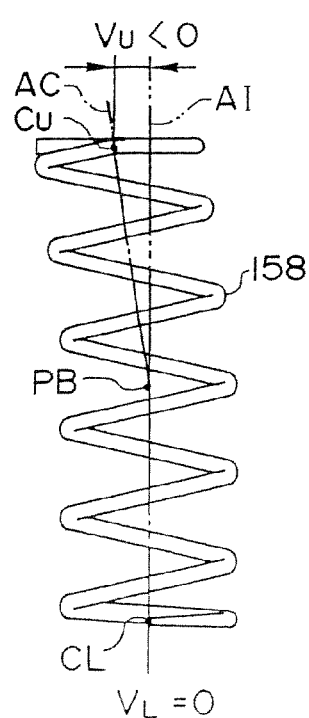

FIG. 4A shows the reference coil spring 36. FIGS. 4B to 4F show suspension coil springs 150, 152, 154, 156, and 158 in which settings of the upper eccentric amount $V_U$ and the lower eccentric amount $V_L$ are different from those of the above-described suspension coil spring 10 (see FIGS. 1A and 1B).

In the suspension coil spring 10 which is shown in FIGS. 1A and 1B, the upper eccentric amount $V_U$ and the lower eccentric amount $V_L$ respectively have an absolute value of larger than 0, and respectively have a negative value. Namely, both the upper end turn portion 32 and the lower end turn portion 34 of the suspension coil spring 10 deviate inwardly of the vehicle body 30 with respect to the imaginary coil axis AI. On the contrary, as in the suspension coil springs 150 to 158 which are shown in FIGS. 4B to 4F, both of the upper eccentric amount $V_U$ and the lower eccentric amount $V_L$ can have an absolute value of larger than "0", or one of them can have "0". Further, both of the upper eccentric amount $V_U$ and the lower eccentric amount $V_L$ can have positive values, and one of them can have a positive value or a negative value.

Namely, as described above, even when the settings of the upper eccentric amount $V_U$ and the lower eccentric amount $V_L$ of the suspension coil springs 150 to 158 are made different from those of the suspension soil spring 10, in the same manner as in the suspension coil spring 10, since the suspension coil springs 150 to 158 respectively have a lead angle and a pitch of each turn, not including the end turn portions 32 and 24, and fundamental spring characteristics which are the same as those of the reference coil spring 36. However, the suspension coil springs 150 to 158 respectively have a degree of inclination and a direction, and an eccentric amount and an eccentric direction, of the spring reaction axis AR, which are different from those of the suspension coil spring 10. In other words, by varying the absolute value of each of the upper eccentric amount $V_U$ and the lower eccentric amount $V_L$ within a range including "0", and by providing one of the upper eccentric amount $V_U$ and the lower eccentric amount $V_L$ with a positive value or a negative value, the degree of the inclination and the direction, and the eccentric amount and direction of the spring reaction axis AR with respect to the imaginary coil AI can be controlled within a sufficiently wide range.

Figure 5C:
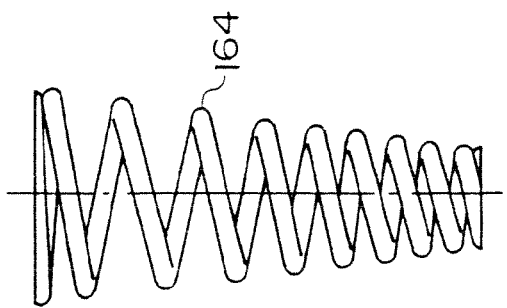
FIGS. 5A to 5E are side views of various-shaped coil springs that can be used for designing the suspension coil spring according to the present embodiment.
Figure 5B:
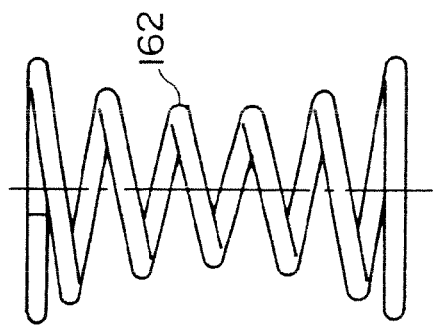
Figure 5E:
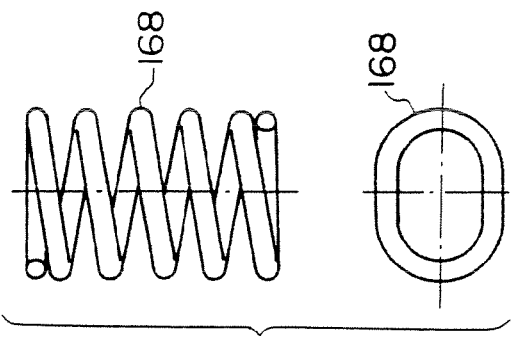
Figure 5A:
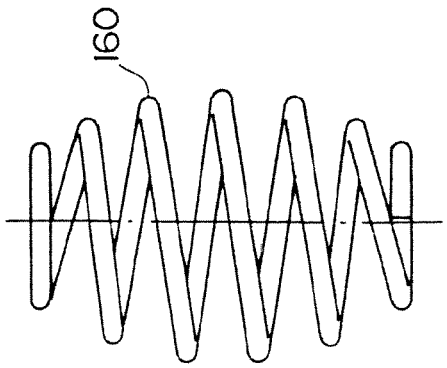
Figure 5D:
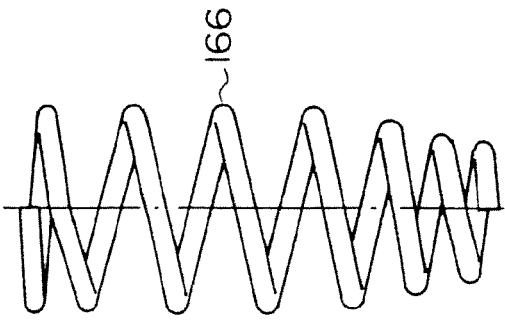

Further, the suspension coil spring 10 is designed on the basis of a cylindrical reference coil spring 36 whose turn diameter of the entire turn is substantially constant. However, the suspension coil spring of the present embodiment can be designed on the basis of non-cylindrical coil springs as shown in FIGS. 5A to 5C. More specifically, the suspension coil spring of the present embodiment can be designed on the basis of various shaped coil springs comprising: a barrel-shaped coil spring 160 which is shown in FIG. 5A and whose turn has a turn diameter which gradually decreases from an axial direction central portion toward both end portions thereof, a drum-shaped coil spring 162 which is shown in FIG. 5B and whose turn has a turn diameter which gradually increases from an axial direction central portion toward both end portions, a conical coil spring 164 which is shown in FIG. 5C and whose turn has a turn diameter which gradually increases from one axial end portion to the other axial end portion, a one side-narrowed coil spring 166 which is shown in FIG. 5D and in which a tapered portion is formed at one axial end portion, and an ellipse-shaped coil spring 168 which is shown in FIG. 5E and whose turn is formed into an ellipse-shaped or elongated-shaped cross sectional configuration.

Also when the suspension coil spring of the present embodiment is designed on the basis of the above-described various-shaped coil springs 160 to 168, design parameters which are newly added to the coils springs 160 to 168 are basically the upper eccentric amount $V_U$, the lower eccentric amount $V_L$ and the eccentric directions, whereby the design of a suspension coil spring in which the spring reaction axis is positioned coincident with or sufficiently close to the load input axis AA and the upper mount center CM which are shown in FIG. 2 is facilitated.

Further, in the suspension device 12 according to the present embodiment, the spring seats 22 and 24 forcibly position the end turn central portion $C_U$ of the upper end turn portion 32 and the end turn central portion $C_L$ of the lower end turn portion 34 of the suspension coil spring 10 respectively coincident with the imaginary coil AI. However, in order for the suspension coil spring 10 to generate the transverse reaction force, the suspension coil spring 10 can be elastically deformed in a direction in which the coil axis AC flexes so as to position the end turn central portion $C_U$ and the end turn central portion $C_L$ close to the imaginary coil AI of the lower end turn portion 34. Accordingly, the $C_U$ and $C_L$ are not necessarily required to be coincident with the imaginary coil AI.

Method of Designing the Suspension Coil Spring

An example of a method of designing the suspension coil spring according to the present embodiment which is structured as described above will be explained hereinafter. In designing the suspension coil spring 10, first, a shape and a size of the suspension coil spring 10 will be determined by using such a method that is shown in a flowchart of FIG. 14. Namely, in order to determine the size and the shape of the suspension coil spring, in steps 310 to 318, available n set (n is an integer) of a combination (combinations) of the size and the shape of the suspension coil spring is presumed. Thereafter, in steps 320 to 328, an FEM analysis is performed by setting boundary conditions for each characteristics (spring characteristics) of 1 to n set of suspension coil springs (preparatory calculation).

In step 330, the results from the FEM analysis performed for each of the 1 to n set of the suspension coil springs are analyzed, and a relationship between a size and a shape of the suspension coil spring, and the spring characteristics is found out, and then expressed by an equation (calculation of a recursive equation). In step 332 to 334, on the basis of the recursive equation resulted from step 330, a size and a shape of the suspension coil spring which are estimated to satisfy the required spring characteristics are calculated. After the size and shape of the suspension coil spring are thus obtained, in step 336, the FEM analysis of the suspension coil spring having the size and the shape which were calculated in step 334 (proofing) is performed again. In step 338, if the spring characteristics obtained from the FEM analysis in step 338 satisfies the required spring characteristics, the analysis processing for obtaining the shape and size of the suspension coil spring is completed. Otherwise, in step 338, if the spring characteristics obtained from the FEM analysis in step 336 does not satisfy the required spring characteristics, the processing returns to step 310, where, while changing a combination of the estimated size and shape of the suspension coil spring, a repetitive calculation is carried out until the required characteristics can be obtained.

Figure 14:
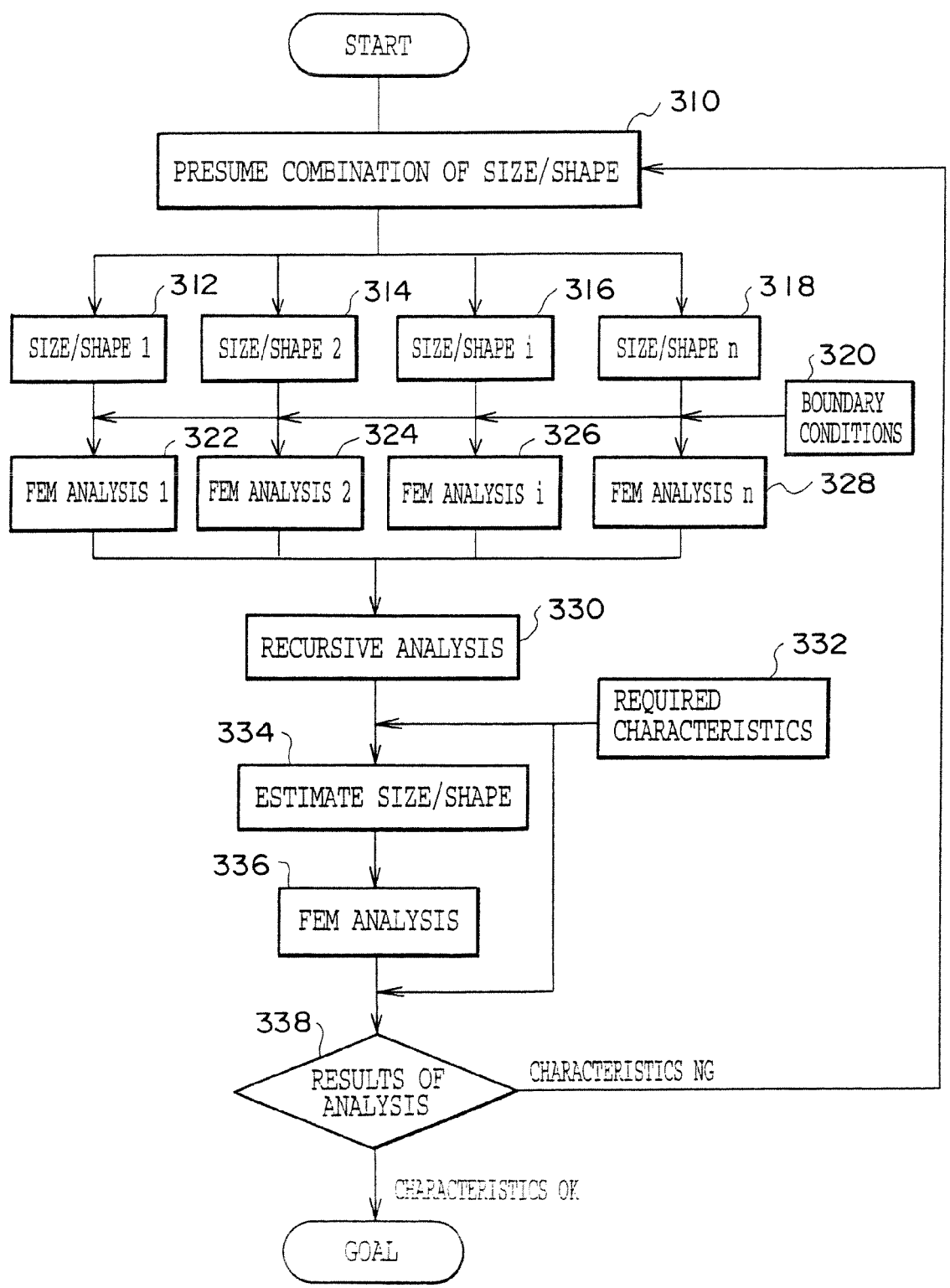
FIG. 14 is a flowchart for explaining an example of a design method for designing the suspension coil spring according to the present embodiment by using a statistical method.

In the analyzing processing shown in FIG. 14, data (multi-variable data), which is used for the recursive analysis in step 330, employs input conditions and results of the FEM analysis. The more the number of target variables and explanatory variables for constituting the multi-variable data, the more the number of times of preparatory calculations for making data that is used for recursive analysis. Thus, first, as for target variables, several kinds of target variables for which special constraints are required are limited and then selected among quantitative variables that represent spring characteristics. On the other hand, as for explanatory variables, quantitative variables, which have been selected from shape parameters and which are supposed to affect the target variables, can be selected as the explanatory variables. However, the number of the explanatory variables may be the same as that of the target variables as described below.

It is presumed that i target variable $y_i$ (i=1, 2, . . . , m) in m target variables is expressed by the following linear recursive equation (1) using n explanatory variables $X_1$ to $X_n$ and n+1 recursive coefficients $a_{oi}$ to $a_{ni}$:

$$y_i = a_{0i} + a_{1i} \times x_1 + a_{2i} \times x_2 + \ldots + a_{ni} \times x_n \quad (1)$$

Here, presuming that a target value of the i target variable $y_i$ is $y_{io}$, explanatory values $x_1$ to $x_n$ is a solution of the following simultaneous equation. In order to provide the simultaneous equation with a unique solution, it is a necessary condition that m=n, that is, the number of the target variables and that of the explanatory variables are the same:

$$\begin{bmatrix} a_{11} \cdot x_1 a_{21} \cdot x_2 + \ldots + a_{n1} \cdot x_n = y_{l0} - a_{0l} \\ a_{1i} \cdot x_1 a_{2i} \cdot x_2 + \ldots + a_{ni} \cdot x_n = y_{i0} - a_{0i} \\ a_{1m} \cdot x_1 a_{2m} \cdot x_2 + \ldots + a_{nm} \cdot x_n = y_{m0} - a_{0m} \end{bmatrix}$$

Figure 15:
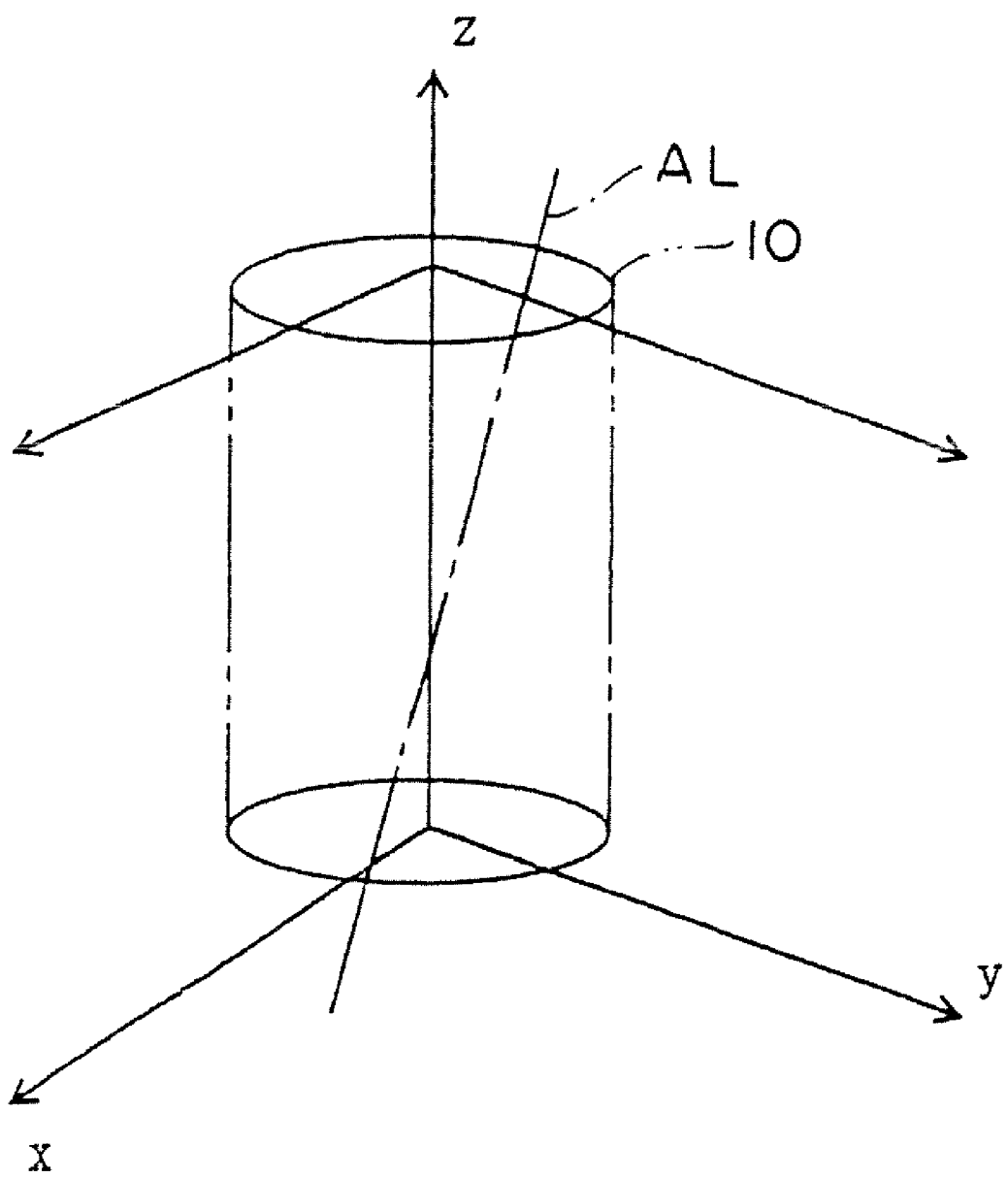
FIG. 15 is a three-dimensional coordinate showing a position and an inclination of a spring reaction axis of the suspension coil spring according to the present embodiment.
Figure 16:
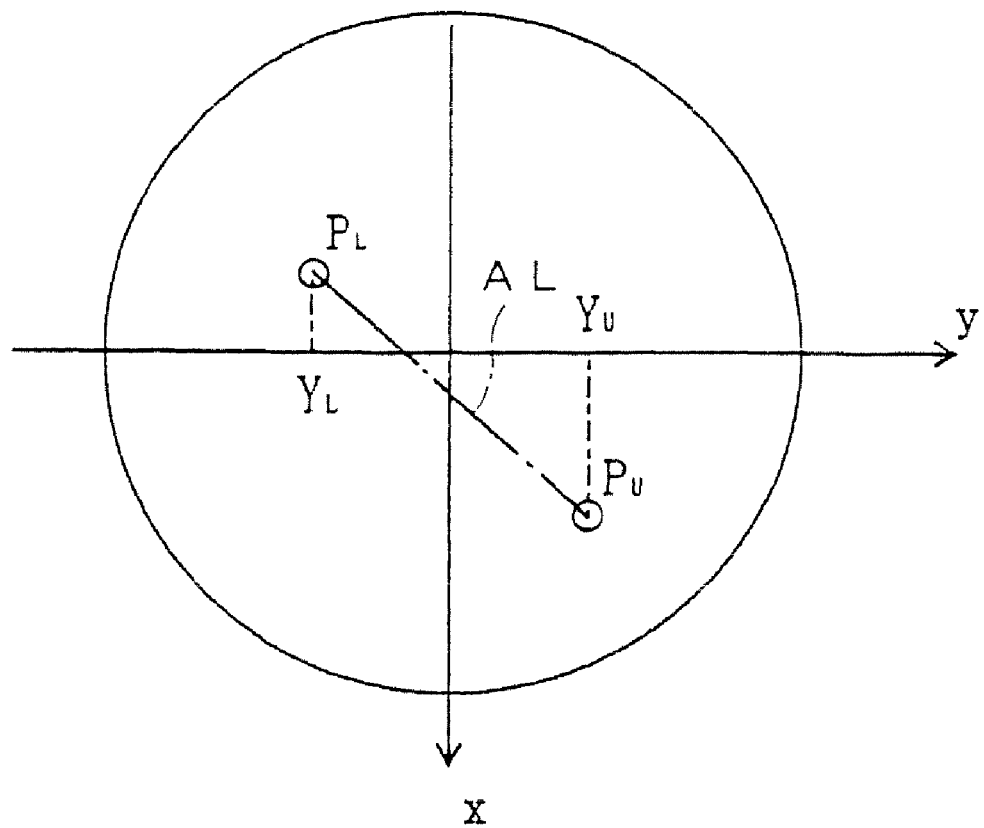
FIG. 16 is a two-dimensional coordinate of target variables in designing the suspension coil spring according to the present embodiment.

Next, a method of controlling the spring reaction axis (load axis AL) of the suspension coil spring 10 will be explained. Here, a position and an inclination of the load axis AL can be represented by using a coordinate axis of intersecting points of the load axis AL and the upper and lower seating surfaces. In according with this, a coordinate axis system which is shown in FIG. 15 can be thought of. In this coordinate axis system, Z axis represents a height direction of the suspension coil spring, Y axis represents an offset direction of the suspension coil spring, and X axis represents a direction intersecting perpendicularly to both the height direction and the offset direction (direction substantially corresponding to a vehicle front and back direction), respectively. Here, in order to facilitate the explanation, it is presumed that the load axis AL must be controlled only in the offset direction. Consequently, two target variables $Y_u$ and $Y_L$ which are shown in FIG. 16 are selected.

Figure 17:
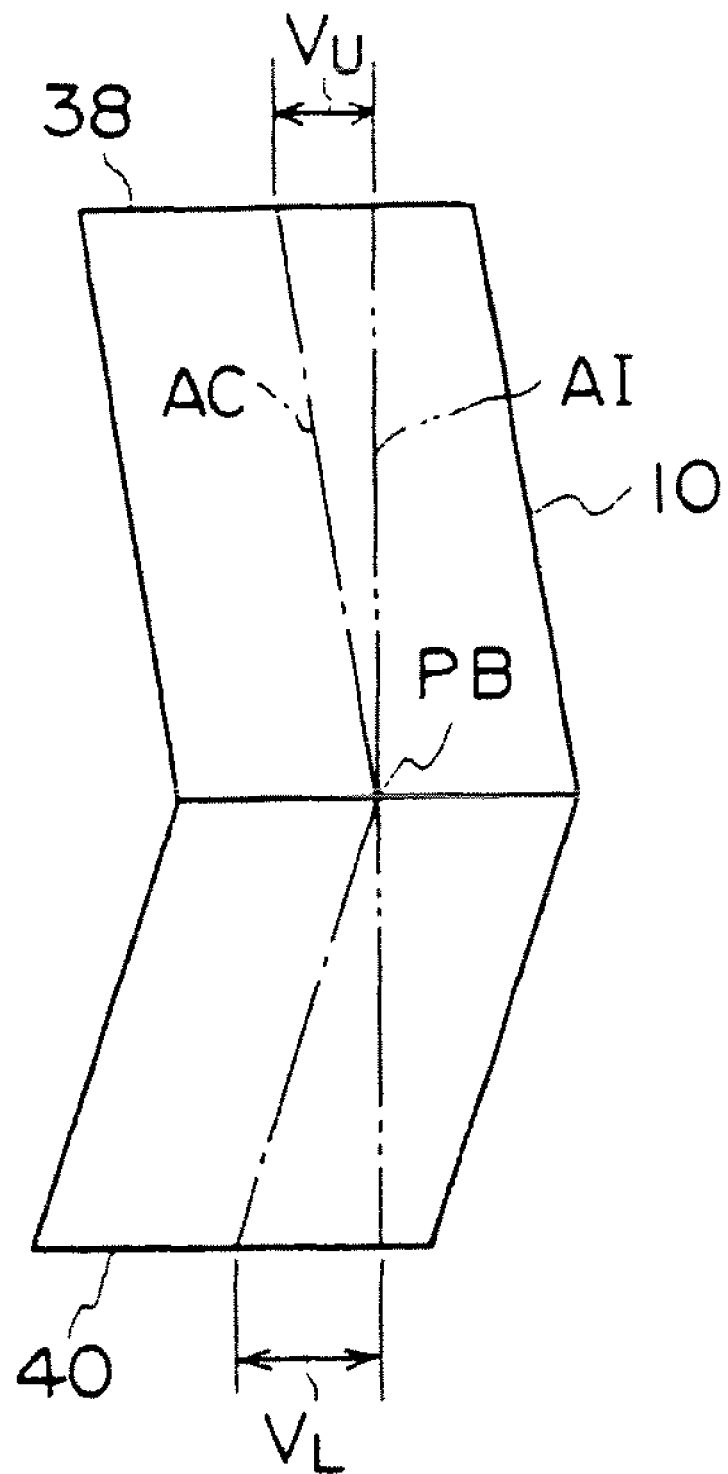
FIG. 17 is a schematic side view of a suspension coil spring for explaining an upper eccentric amount and a lower eccentric amount in the suspension coil spring according to the present embodiment.

As described above, the load axis AL of the suspension coil spring 10 can be controlled by bending the coil axis AC (see FIGS. 1A and 1B) into a V shape along the offset direction. In this case, it is estimated that a bending amount of the coil axis AC and a moving amount of the load axis AL have a constant relationship therebetween. Therefore, bending amounts $Y_U$ and $Y_L$ of the coil spring shown in FIG. 17 are used as the explanatory variables.

Figure 18:
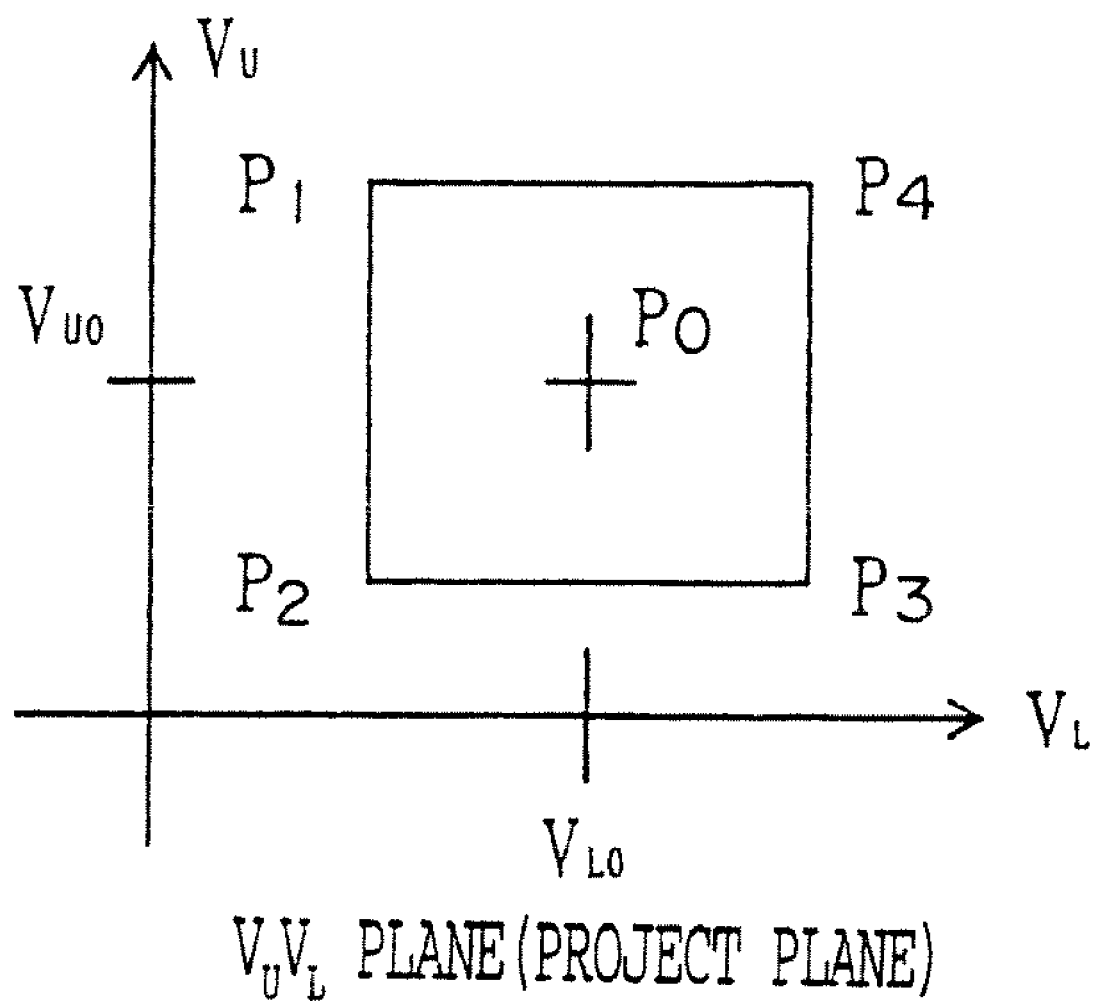
FIG. 18 shows a coordinate indicating $V_U$-$V_L$ plane view (projected plane) which is represented by a recursive equation resulted from a designing method shown in FIG. 14.

Then, presuming that recursive equations of $Y_U = A_1 + B_1 \times V_U + C_1 \times V_L$ and $Y_L = A_2 + B_2 \times V_U + C_2 \times V_L$ ($A_1$, $A_2$, $B_1$, $B_2$, $C_1$ and $C_2$: recursive coefficients), these provide a best fit plane (the remaining sum of squares is minimum) at a point $P_i$ ($Y_{Ui}$, $V_{Ui}$, $V_{Li}$) and a point $Q_i$ ($Y_{Li}$, $V_{Ui}$, $V_{Li}$) (i=1, 2, . . . , n) on coordinate axis systems of $Y_U$-$V_U V_L$ and $Y_L$-$V_U V_L$. Namely, since $V_U$, $V_L$, which are actually supposed to form a curved surface, are approximated to form a $V_U V_L$ plane (project plane) which is shown in FIG. 18, the preparatory calculation and the recursive analysis can be performed within a range close to a solution as much as possible. Further, in an ordinary recursive calculation, more data is used to remove off values that may affect the calculation. However, in this case, since constants and variables are distinct from each other, if extreme values are removed, the off value does not affect the recursive calculation a lot. Therefore, in order to improve recursive accuracy, during the preparatory calculation, it is preferable to reduce the range of calculation not by increasing the number of the combination of $V_U$ and $V_L$ within a range of the calculation but by decreasing the number of the combination of $V_U$ and $V_L$ for each preparatory calculation and then repeating the preparatory calculation over and over. Specifically, estimate values ($V_{U0}$, $V_{L0}$) and error ranges ($\Delta V_U$, $V_L$) of a solution are presumed as initial conditions, the preparatory calculation is carried out by using the combinations listed below (table 1), and recursive equations can be obtained. If the solution cannot be estimated, an equation of ($V_{U0}$, $V_{L0}$)=(0, 0) is presumed as an estimate value of the solution, the preparatory calculation is carried out by taking an extra error range, and the recursive equations are determined.

TABLE 1

|   | $V_U$ | $V_L$ |
|---|---|---|
| 1 | $V_{U0}$ | $V_{L0}$ |
| 2 | $V_{UO} - \Delta V_U$ | $V_{LO} + \Delta V_L$ |
| 3 | $V_{UO} - \Delta V_U$ | $V_{LO} - \Delta V_L$ |
| 4 | $V_{UO} + \Delta V_U$ | $V_{LO} - \Delta V_L$ |
| 5 | $V_{UO} + \Delta V_U$ | $V_{LO} + \Delta V_L$ |

Then, the solution determined by the simultaneous recursive equation is regarded as an initial value, the error range is made smaller than the previous one, and the preparatory calculation is carried out repeatedly. Accordingly, a solution which is determined by the recursive equation is as follows:

$$\begin{bmatrix} V_U \\ V_L \end{bmatrix} = \begin{bmatrix} B_1 & C_1 \\ B_2 & C_2 \end{bmatrix}^{-1} \begin{bmatrix} Y_U - A_1 \\ Y_L - A_2 \end{bmatrix}$$

However, $$B_1 C_2 - C_1 B_2 \neq 0$$

Then, the FEM analysis is performed by using this solution, and it is determined whether or not the spring characteristics resulted from this analysis satisfies the required characteristics.

As described above, due to a combination of the finite element code and the statistic method, a shape and a size of the suspension coil spring which satisfy the required characteristics can be provided. Accordingly, the incorporation of statistic processings as described herein into a prepost of the FEM analysis facilitate the designers to implement an optimal design of the suspension coil spring more easily. Further, here, the design method of the suspension coil spring has been introduced by using a simple specific example. However, if more target variables (target spring characteristics) are used or more explanatory variables (input conditions such as spring shape and the like) are required, although the selection of variables can be a little bit complicated, it can be handled in the same manner as described above.

Figure 19A:
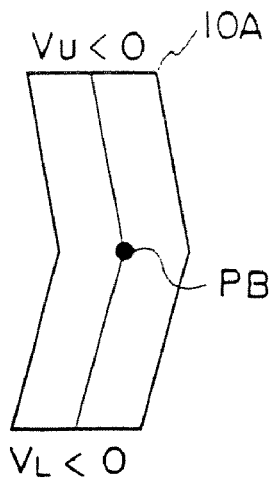
FIGS. 19A to 19I show schematic side views of suspension coil springs for illustrating the results from the analysis of the suspension coil springs by using the FEM analysis in the design method of FIG. 14.
Figure 19D:
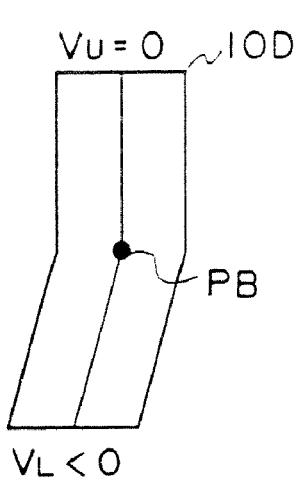
Figure 19G:
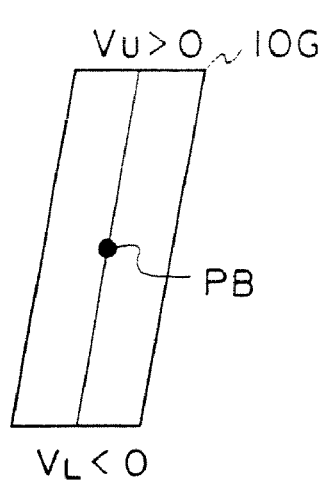
Figure 19B:
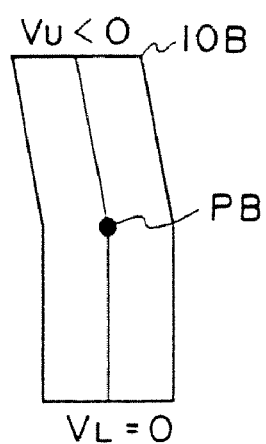
Figure 19E:
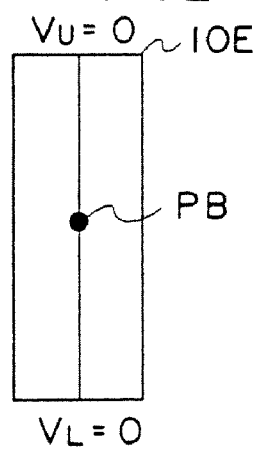
Figure 19H:
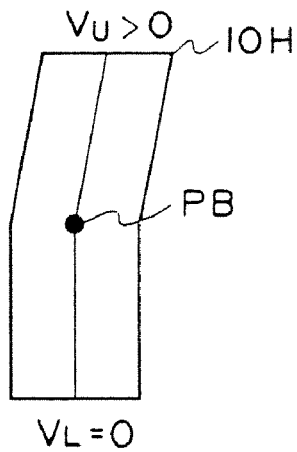
Figure 19C:
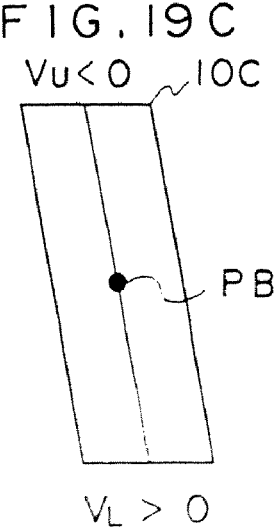
Figure 19F:
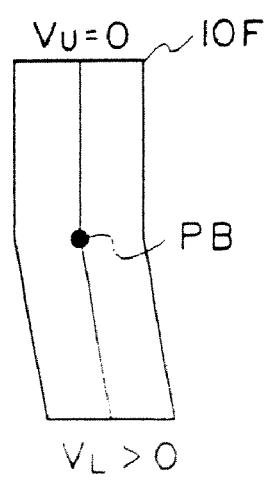
Figure 19I:
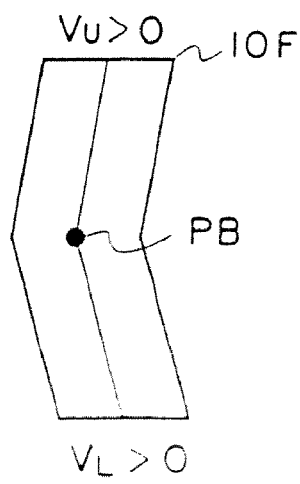

With reference to FIGS. 19A to 19I through FIGS. 21A and 21B, examples of the results of the FEM analysis of the suspension coil spring will be explained, hereinafter. In designing the suspension coil spring according to the present embodiment, as described above, the suspension coil spring is designed on the basis of the reference coil spring having the linear imaginary coil axis. More specifically, as shown in FIG. 19E, in a case in which a suspension coil spring 10E, in which the upper eccentric amount $V_U$=0 and the lower eccentric amount $V_L$=0, is used as the reference coil spring, the upper eccentric amount $V_U$ is changed to one of a positive value, 0 and a negative value, while the lower eccentric amount $V_L$ is changed to one of a positive value, 0 and a negative value. Accordingly, suspension coil springs 10A to 10I can be considered on the basis of 9 patterns of as shown in FIGS. 19A to 19I.

In the suspension coil springs 10A to 10I which are shown in FIGS. 19A to 19I, in order to facilitate the description of the results of the FEM analysis, the upper eccentric amount $V_U$ is set to one of −20 mm, 0 mm, and 20 mm, while the lower eccentric amount $V_L$ is set to one of −20 mm, 0 mm and 20 mm. Further, the bending point PB of the coil axis AC is set at a position corresponding to half a total turns of the suspension coil spring. The FEM analysis is conducted for each of the suspension coil springs 10A to 10I. The results from the FEM analysis are shown as follows (table 2):

TABLE 2

|  | eccentric amount (mm) | | load eccentric position (mm) | | | |
|---|---|---|---|---|---|---|
|  | | | upper | | lower | |
|  | $V_U$ | $V_L$ | X | Y | X | Y |
| 10A | −20.0 | −20.0 | −1.8 | 19.4 | 0.7 | 41.7 |
| 10B | −20.0 | −20.0 | −1.2 | 5.2 | 0.2 | 40.5 |
| 10C | −20.0 | −20.0 | −0.7 | −7.6 | 0.3 | 37.1 |
| 10D | 0.0 | 0.0 | −1.3 | 15.7 | −1.1 | 28.9 |
| 10E | 0.0 | 0.0 | −1.0 | 2.6 | −0.5 | 25.8 |
| 10F | 0.0 | 0.0 | −0.4 | 10.5 | −0.5 | 23.4 |
| 10G | 20.0 | 20.0 | −2.1 | 13.3 | −2.2 | 15.8 |
| 10H | 20.0 | 20.0 | −0.1 | −1.3 | −1.2 | 13.9 |
| 10I | 20.0 | 20.0 | 0.3 | −14.4 | −1.0 | 10.9 |
| target | 12.4 | −2.2 | 0.0 | 2.0 | 0.0 | 18.6 |

Figure 20:
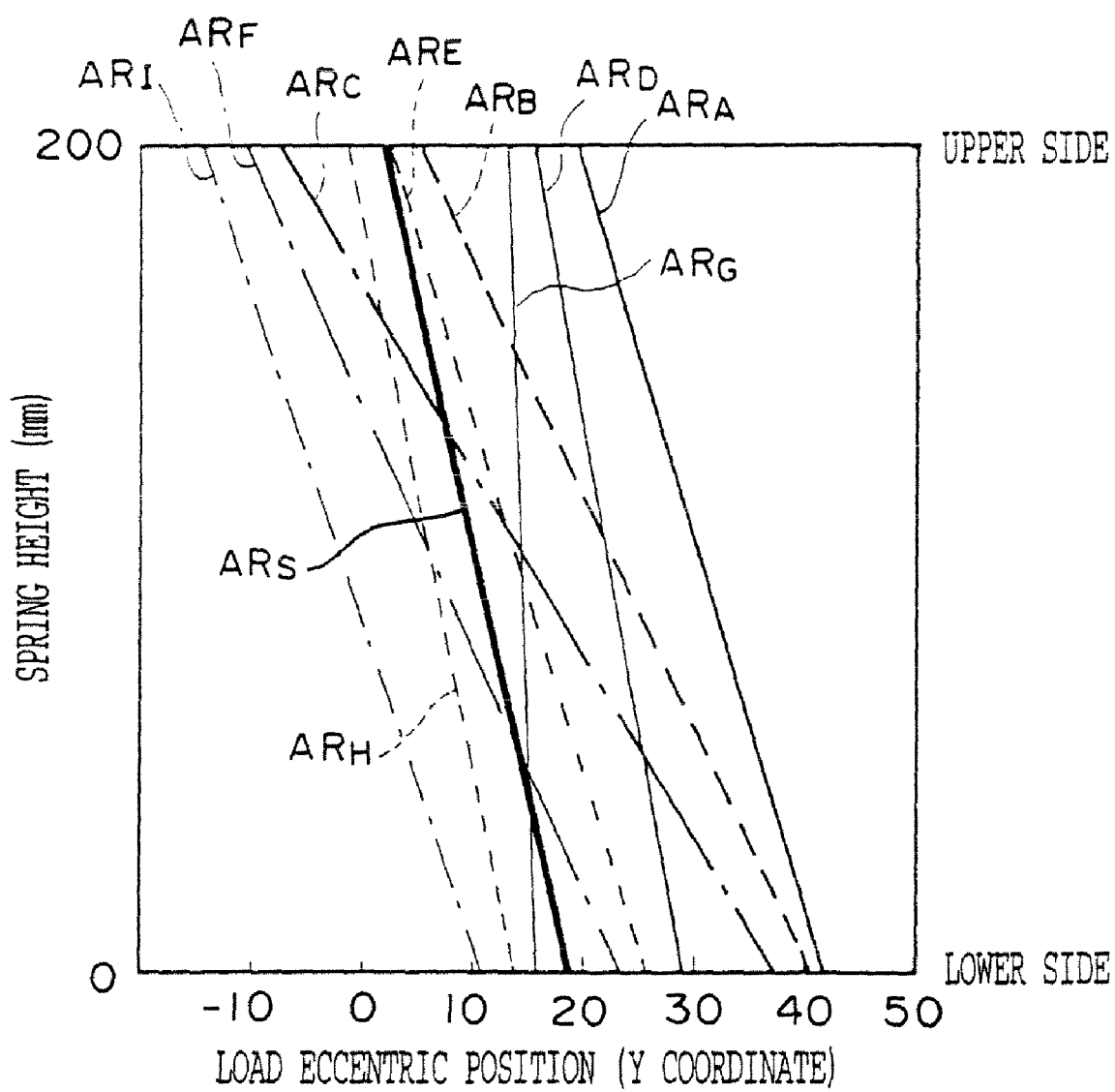
FIG. 20 shows a two-dimensional coordinate indicating the spring reaction axes and a target spring reaction axis, of the suspension coil spring, obtained from the FEM analysis in the design method of FIG. 14.
Figure 21A:
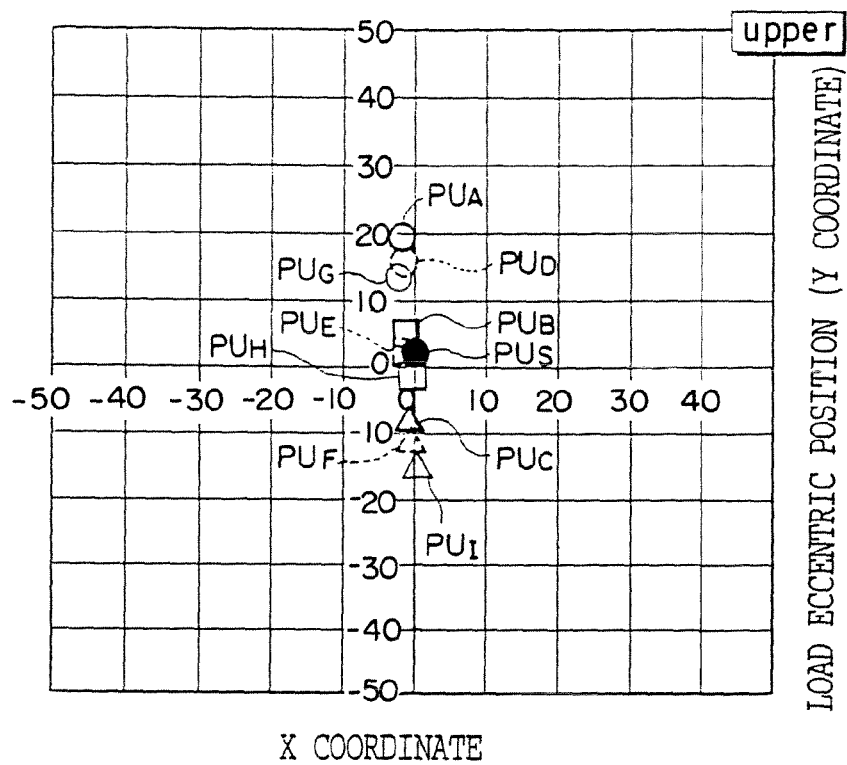
FIGS. 21A and 21B are two-dimensional coordinates each showing points of application of force of the spring reaction axes and a target spring reaction axis of the suspension coil spring, obtained by the FEM analysis in the design method shown in FIG. 14.

A Y-H coordinate plane of FIG. 20 indicates spring reaction axes $AR_A$ to $AR_I$ and a target spring reaction axis $AR_S$ of the suspension coil springs 10A to 10I resulted from the FEM analysis, respectively. Further, the coordinate plane of FIG. 21A shows points of application of force $PU_A$ to $PU_I$ and a target point of application of force $PU_S$ onto the upper seating surfaces of the suspension coil springs 10A to 10I resulted from the FEM analysis, respectively. The coordinate plane of FIG. 21B shows points of application of force $PL_A$ to $PL_I$, and a target point of application of force $PL_S$ onto the lower seating surface of the suspension coil springs 10A to 10I resulted from the FEM analysis, respectively.

Figure 21B:
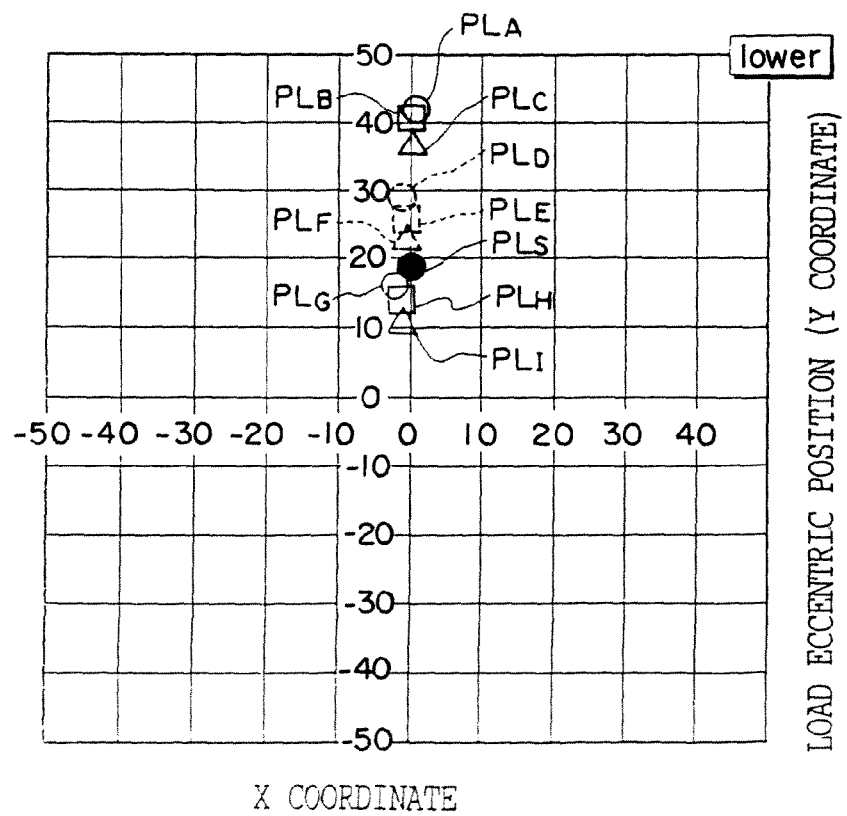

As is apparent from FIGS. 20, 21A and 21B, the coil axis of the suspension coil spring is bent into a V shape. Eccentric amounts and eccentric directions of the upper eccentric amount $V_U$ and the lower eccentric amount $V_L$ (positive direction or negative direction) are respectively varied. Accordingly, a position and an inclination of the spring reaction axis of the suspension coil spring can be respectively controlled along the offset direction. Then, as described above, the results from the FEM analysis are analyzed. A relationship between the size and the shape of the suspension coil spring and the spring characteristics is found out, and then expressed by an equation (calculation of the recursive equation). Accordingly, the design of the suspension coil spring having required spring characteristics is facilitated.

Next, with reference to FIG. 6 to FIGS. 11A and 11B, a description of Examples will be made in which the suspension coil spring 10 according to the present embodiment is applied to the suspension device 12.

Example 1

In the suspension device 12 which is shown in FIG. 2, as long as conditions such as a tire width of the wheel 44 and the like are constant and a magnitude of the road surface reaction force W does not change noticeably, it can be considered that an inclination and a position of the load input axis AA do not change. Assuming this, FIG. 7 to FIGS. 11A and 11B respectively show coordinate planes on which positions at which the load input axis AA and the spring reaction axis AR pass through the spring seat 22 and the spring seat 24 (points of application of force). In the coordinate planes, a transverse axis represents a front and back direction of a vehicle body 30, and a vertical axis represents a transverse direction of the vehicle body 30. Numerical values given to both the transverse axis and the vertical axis on each of the coordinate planes in FIG. 7 to FIGS. 11A and 11B are relative indices and do not represent actual lengths.

In each of FIG. 7 to FIGS. 11A and 11B, a point of application of force to the upper spring seat 22 of the load input axis AA is represented by $PA_U$ and a point of application of force to the lower spring seat 24 is represented by $PA_L$. Further, a point of application of force to the upper spring seat 22 of the spring reaction axis AR is represented by $PR_U$ and a point of application of force to the lower spring seat 24 is $PR_L$. Here, as shown in FIGS. 7A to 11A, the point of application of force $PA_U$ is located at a position represented by (−3.7, 0) of the coordinate plane, and the center of the upper spring seat 22 is an original point (0, 0) of the coordinate plane. Moreover, as shown in FIGS. 7B to 11B, the point of application of force $PA_L$ is located at a position represented by (−37.3, 0) of the coordinate plane.

Figure 6:
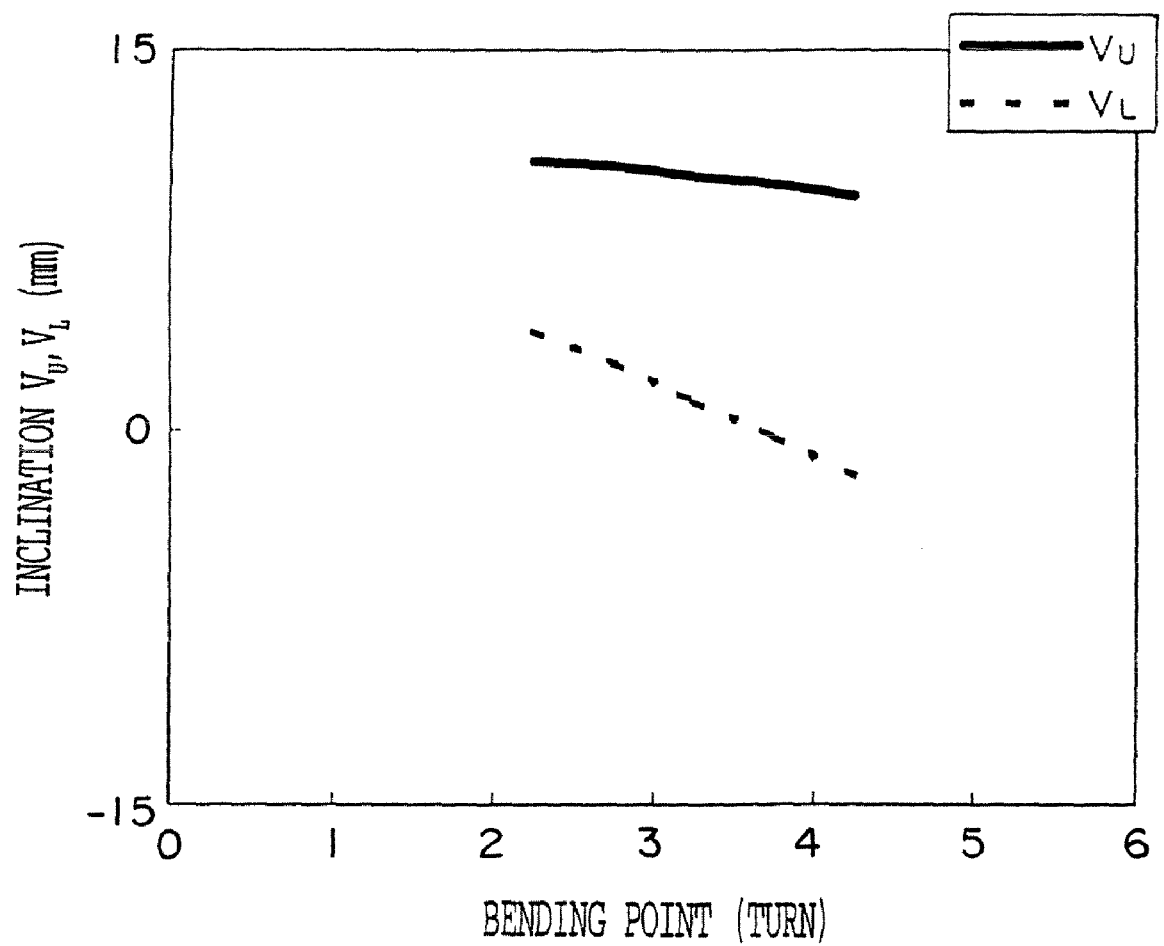
FIG. 6 is a view of characteristics of a relationship between an upper eccentric amount $V_U$ and a lower eccentric amount $V_L$, and a bending point PB in a suspension coil spring according to Example 1 of the present invention.
Figure 7A:
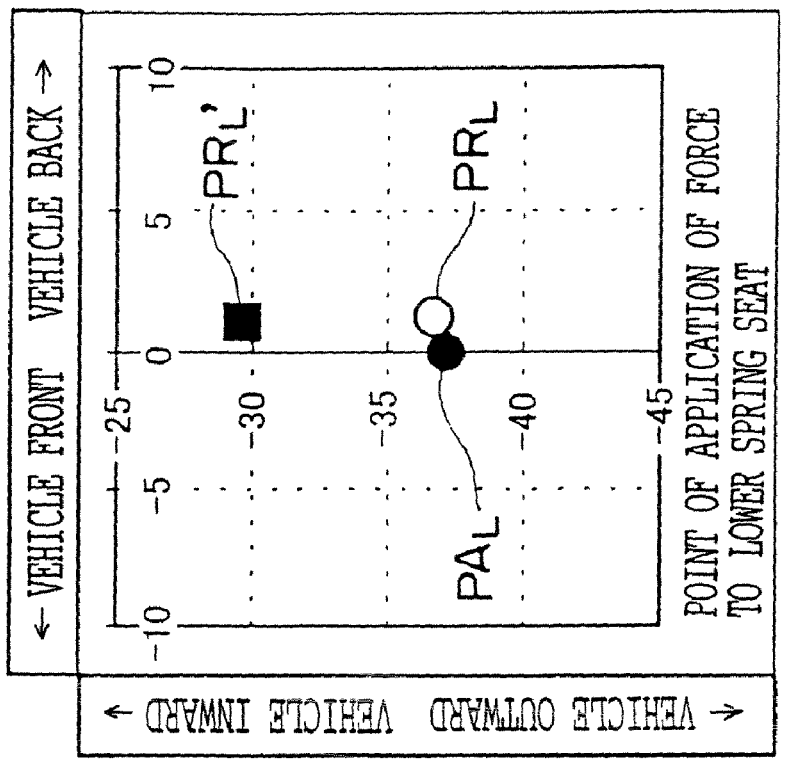
FIGS. 7A and 7B are coordinates each showing points of application of force onto an upper spring seat and a lower spring seat of the suspension coil spring according to Example 1 of the present invention.
Figure 7B:
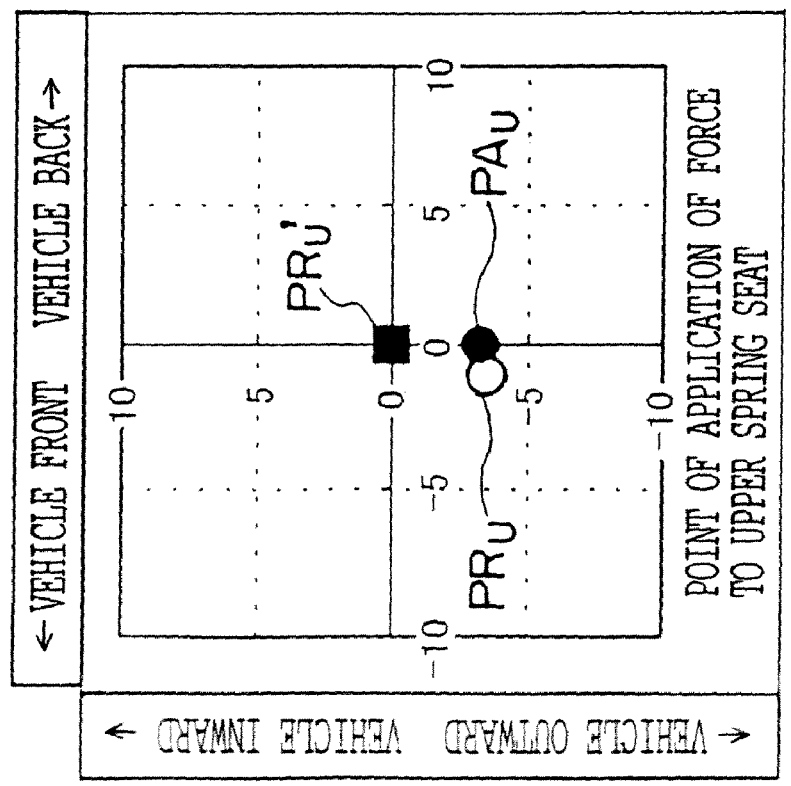
Figure 8A:
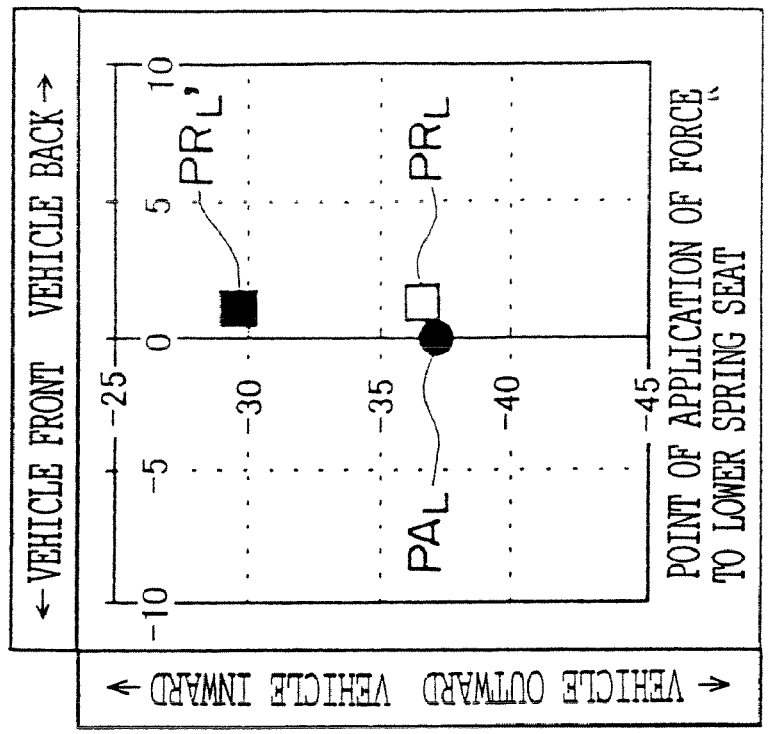
FIGS. 8A and 8B are coordinates each showing points of application of force onto an upper spring seat and a lower spring seat of the suspension coil spring according to Example 1 of the present invention.
Figure 8B:
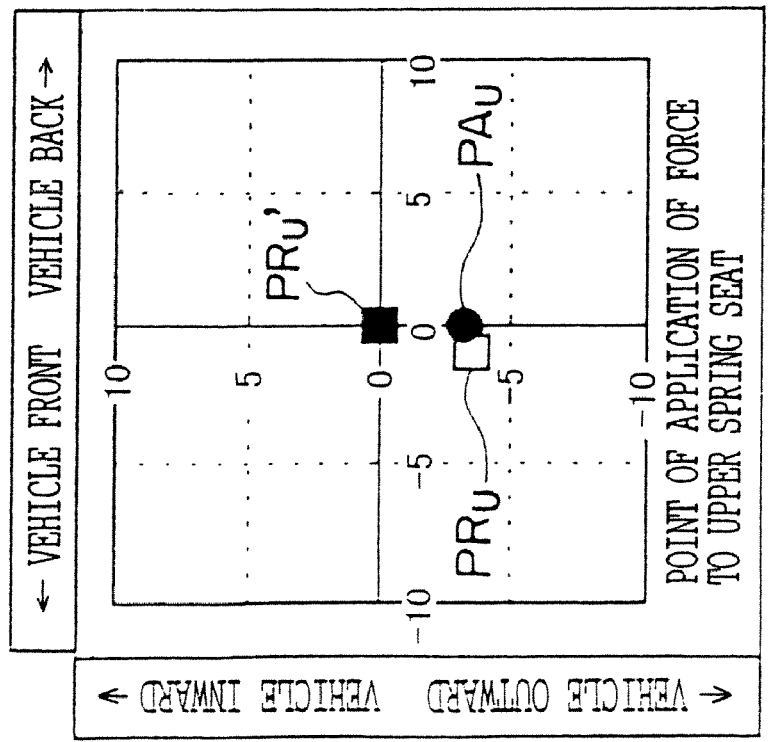
Figure 9A:
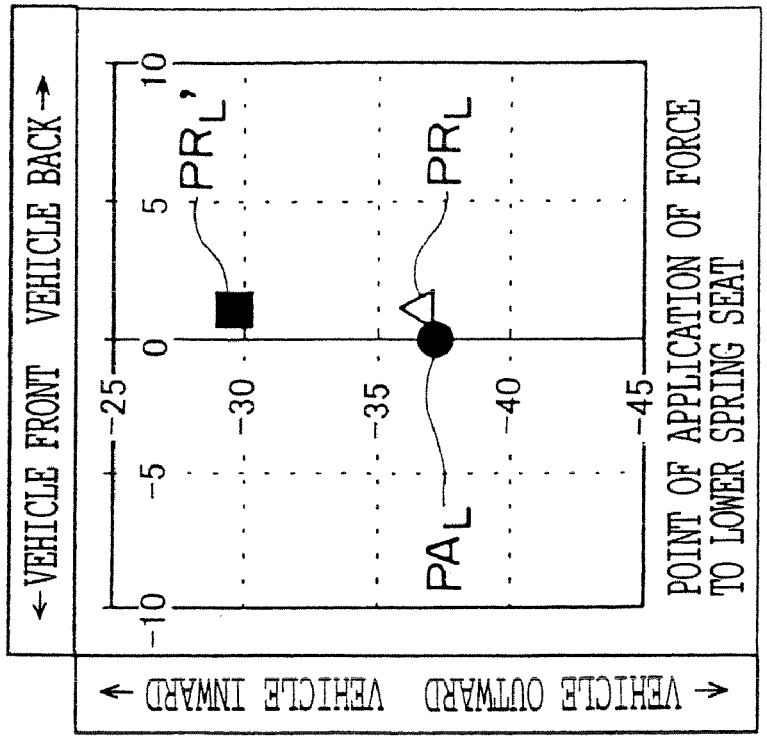
FIGS. 9A and 9B are coordinates each showing points of application of force on an upper spring seat and a lower spring seat of the suspension coil spring according to Example 1 of the present invention.
Figure 9B:
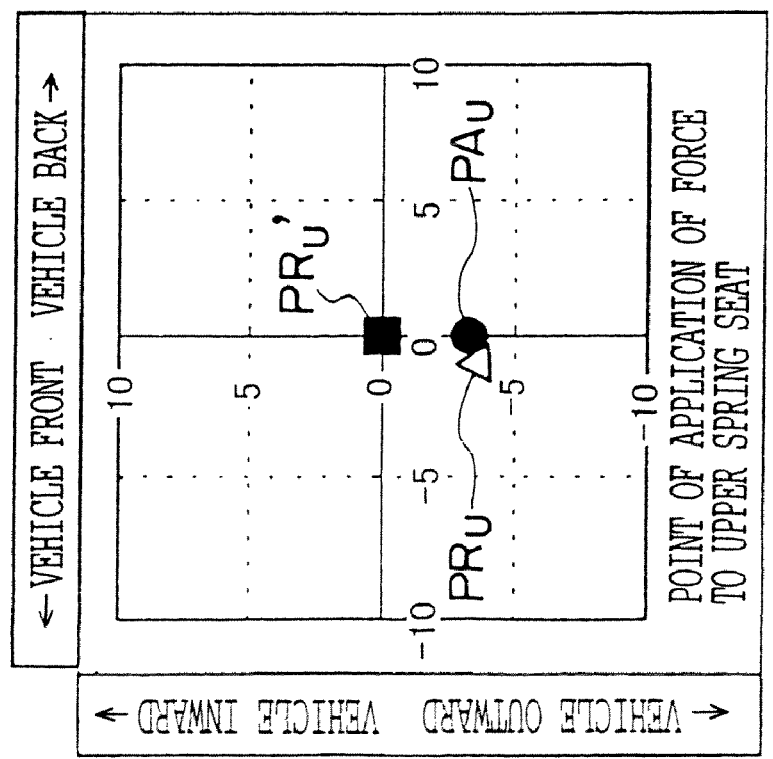
Figure 10A:
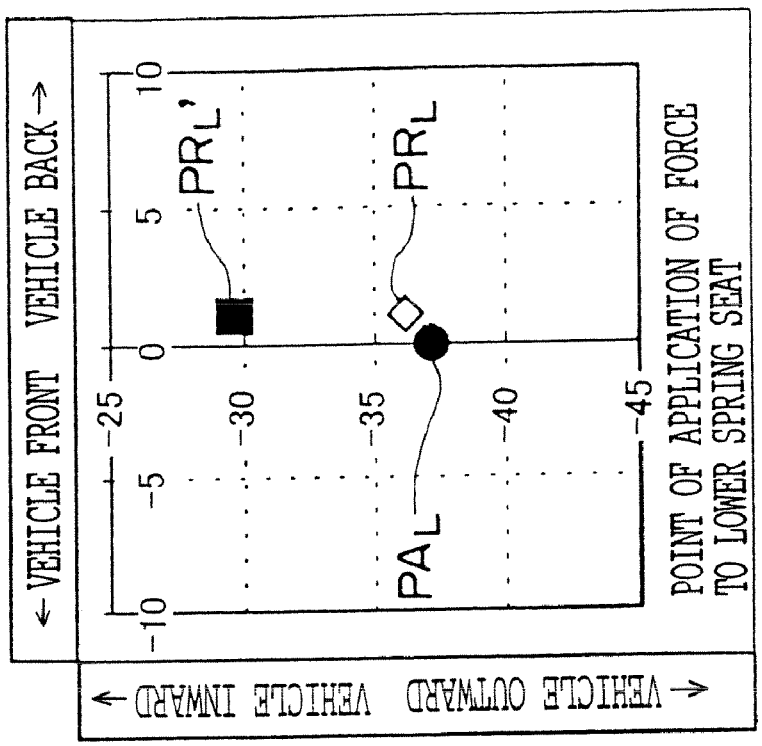
FIGS. 10A and 10B are coordinates each showing points of application of force on an upper spring seat and a lower spring seat of the suspension coil spring according to Example 1 of the present invention.
Figure 10B:
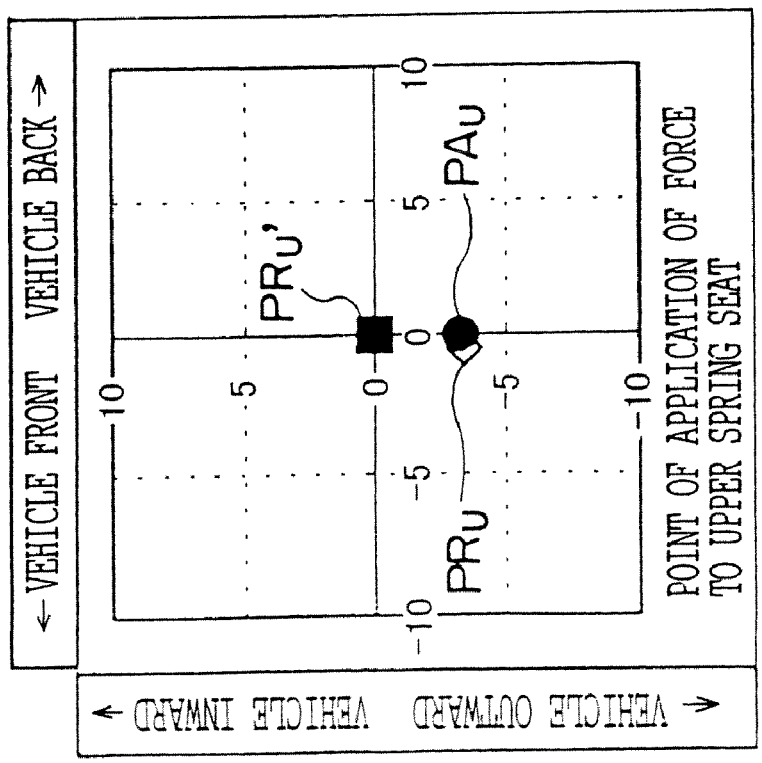

FIG. 6 shows a relationship between magnitudes of the upper eccentric amount $V_U$ and the lower eccentric amount $V_L$, and the bending point PB, which relationship becomes necessary to correspond the point of application of force $PR_U$ of the spring reaction axis AR and the point of application of force $PA_U$ to each other at the spring seat 22, and to correspond the point of application of force $PR_L$ and the point of application of force $PA_L$ to each other at the spring seat 24. As described above, the upper eccentric amount $V_U$ and the lower eccentric amount $V_L$, and the bending point PB are design parameters that mutually relate to each other. When one of the upper and lower eccentric amount $V_U$ and $V_L$, and the bending point PB varies, the other also varies. Further, the relationship between the upper and lower eccentric amount $V_U$ and $V_L$, and the bending point PB is calculated by a known finite element method on the basis of values of design characteristics the suspension device 12, and design parameters of the reference coil spring 36.

On the other hand, in FIG. 7 to FIGS. 11A and 11B, are shown five suspension coil springs 10 each of which is manufactured on the basis of the results of calculations in FIG. 6 and has the eccentric amounts $V_U$ and $V_L$, and the bending point PB which are different from each other, and are also shown the measurement results of points of application of force $PR_U$ and $PR_L$ of the spring reaction axis AR of each suspension coil springs 10 when assembled to the suspension device 12. Here, FIGS. 7A and 7B show a case of the bending point PB=2.250 turning point, FIGS. 8A and 8B show a case of the bending point PB=2.750 turning point, FIGS. 9A and 9B show a case of the bending point PB 3.250 turning point, FIGS. 10A and 10B show a case of the bending point PB=3.750 turning point, and FIGS. 11A and 11B show a case of the bending point PB=4.250 turning point.

In FIGS. 7A and 7B to FIGS. 11A and 11B, in order to compare the reference coil spring 36 with the suspension coil spring 10 of the present embodiment, the point of application of force $PR_U'$ of the spring reaction axis AR' at the spring seat 22 and the point of application of force $PR_L'$ of the spring reaction axis AR' at the spring seat 24 when the reference coil spring 36 is assembled to the suspension device 12 are shown, and the points of application of forces $PR_U$ and $PR_L$ of the suspension coil spring 10 are shown as well.

As is apparent from FIGS. 7A to 11A, as compared with the point of application of force $PR_U'$ of the reference coil spring 36, the point of application of forces $PR_U$ at the upper spring seat 22 of the suspension coil spring 10 which was manufactured on the basis of the results of calculation in FIG. 6 is sufficiently close to the point of application of forces $PA_U$ of the spring reaction axis AR. As is apparent from FIG. 7B to FIG. 11B, as compared with $PR_L'$ of the reference coil spring 36, the point of application of forces $PR_L$ at the lower spring seat 24 of the suspension coil spring 10 which was manufactured on the basis of the results of calculation in FIG. 6 is also sufficiently close to the point of application of forces $PA_L$ of the spring reaction axis AR.

Accordingly, when the suspension coil spring 10 of the present embodiment is assembled to the suspension device 12, as compared when as compared when the reference coil spring 36 is assembled to the suspension device 12, a transverse force WT (see FIG. 3B) that occurs in accordance with a difference between the point of application of force $PR_U$ and the point of application of force $PA_U$ and a difference between the point of application of force $PR_L$ and the point of application of force $PA_L$ can be decreased a great deal or cancelled. Accordingly, an increase of a friction at the shock absorber 14 due to the transverse force WT can effectively be prevented, and vehicle riding quality can be improved. Further, a difference between the spring reaction force AR and the mount center CM (see FIG. 2) of the strut mount 20 can be decreased a great deal or cancelled. Accordingly, a deterioration of a steering performance due to a force forcibly acting against another force at the strut mount 20 can effectively be prevented.

Example 2

In Example 1, a description has been made of a case in which the points of application of force $PR_U'$ and $PR_L'$ of the spring reaction axis AR' of the suspension coil spring 36 hardly deviate in the vehicle front and back direction from the points of application of forces $PA_U$ and $PA_L$ of the load input axis AA. Meanwhile, when the points of application of force $PR_U'$ and $PR_L'$ of the spring reaction axis AR' of the suspension coil spring 36 deviate in the vehicle front and back direction from the points of application of forces $PA_U$ and $PA_L$ of the load input axis AA, a moment around of the king pin axis AK (see FIG. 2) as a central steering axis becomes unbalanced thus deteriorating the vehicle straight drive stability.

In order to solve the aforementioned problem, in the suspension coil spring 36 having a conventional structure, in order to considerably reduce deviations of the points of application of force $PR_U'$ and $PR_L'$ in the vehicle front and back direction from the points of application of forces $PA_U$ and $PA_L$, a method has been employed in which a terminal position of the upper end turn portion and that of the lower end turn portion of the suspension coil spring 36 are optimized by controlling (increasing/decreasing) the total turns T of the suspension coil spring 36. In the suspension coil spring 10 which is designed on the basis of the suspension coil spring 36 which is designed by the method described above, the deviation of the points of application of force $PR_U$ and $PR_L$ of the suspension coil spring 10 in the vehicle front and back direction from the points of application of forces $PA_U$ and $PA_L$ are sufficiently made smaller.

However, in some cases, the method of optimizing the respective terminal positions of the upper and lower end turn portions of the suspension coil spring 36 by controlling the total turns T of the suspension coil spring 36 may cause a disadvantage to the suspension coil spring 10 which is desired to be made compact. Thus, instead of controlling the total turns T, it is desired to position the points of application of force $PR_U$ and $PR_L$ of the suspension coil spring 10 and the points of application of forces $PA_U$ and $PA_L$ of the load input axis AA sufficiently close to each other.

In Example 2, with reference to FIGS. 12A and 12B, a method of designing and manufacturing the suspension coil spring 10 will be explained in a case in which, without controlling the total turns T, the points of application of force $PR_U$ and $PR_L$ are positioned sufficiently close to the points of application of forces $PA_U$ and $PA_L$ of the load input axis AA, respectively, in the vehicle front and back direction and the vehicle transverse direction.

Figure 12A:
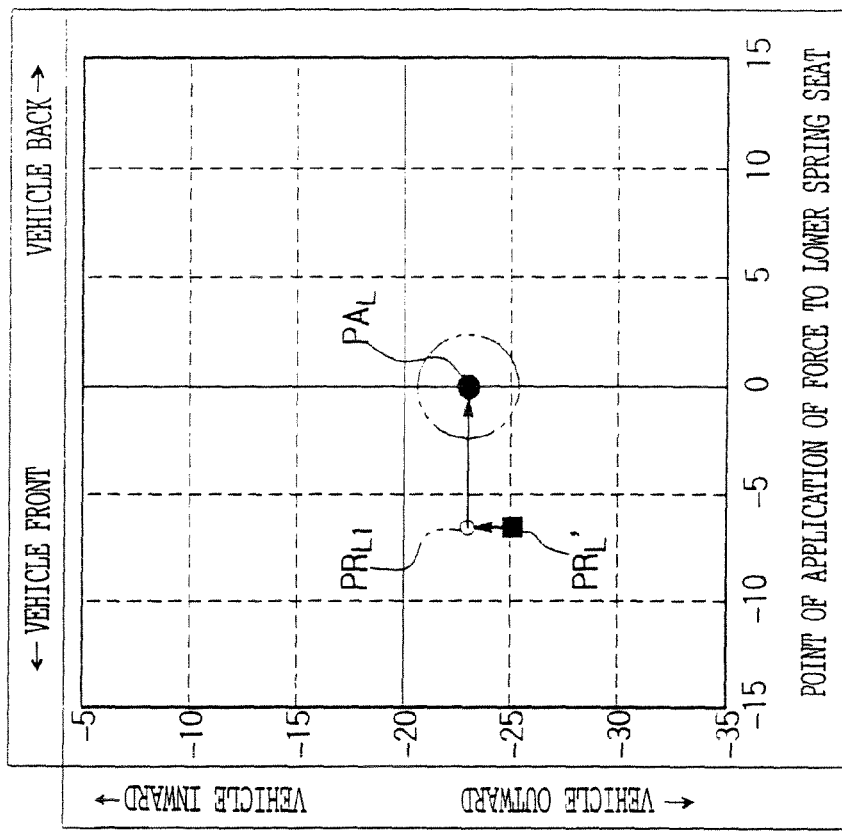
FIGS. 12A and 12B are coordinates each showing a moving process of points of application of force for designing a suspension coil spring according to Example 2 of the present invention.
Figure 12B:
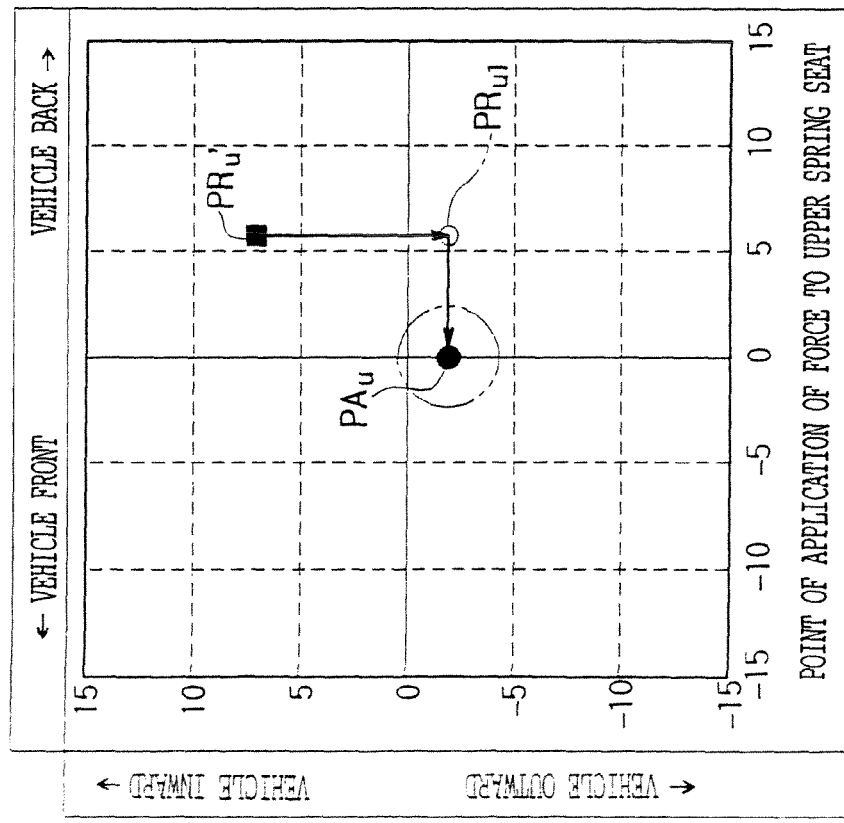
Figure 13:
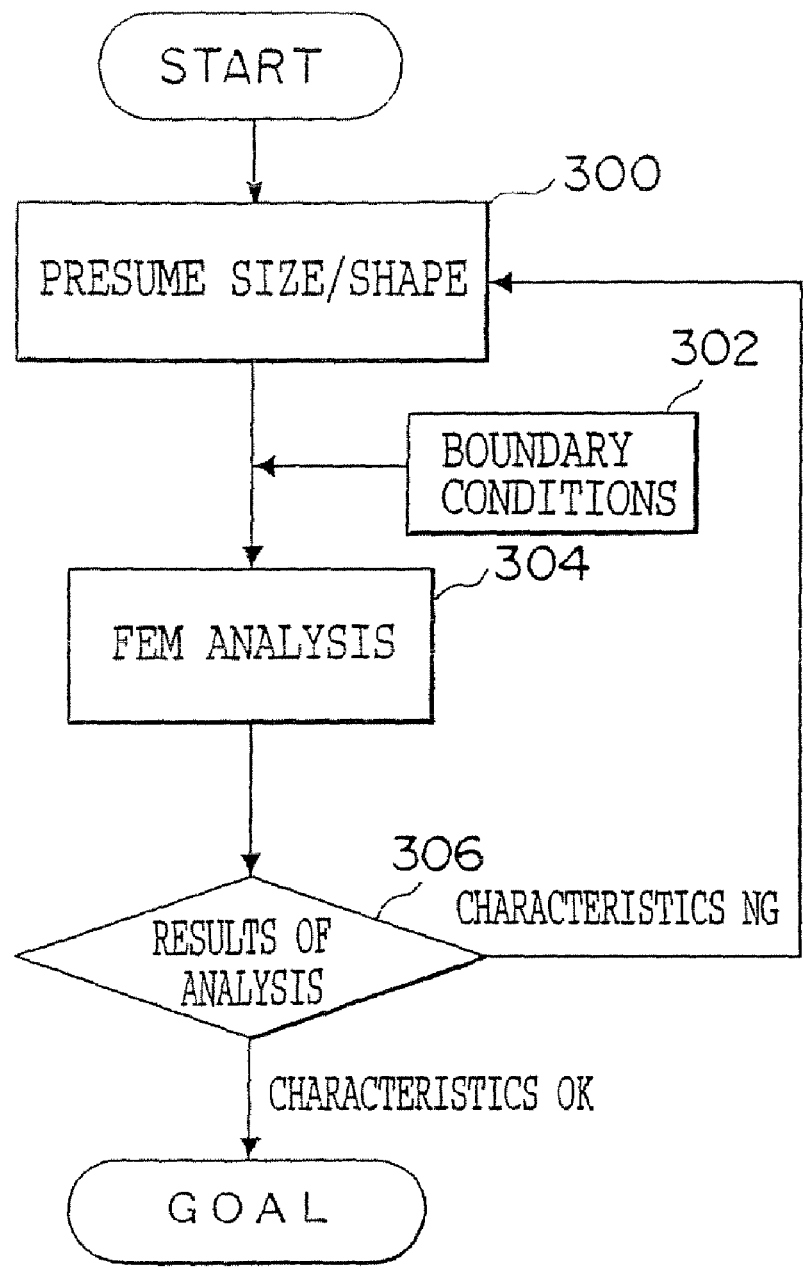
FIG. 13 is a flowchart for explaining an example of a design method of a conventional suspension coil spring using a finite element method.

FIGS. 12A and 12B show coordinate planes each of which indicates positions (points of application of force) of the spring seats 22 and 24 through which the load input axis AA and the spring reaction force AR pass. In the coordinate planes, a transverse axis represents a front and back direction of the vehicle body 30, and a vertical axis represents a transverse direction of the vehicle body 30. Further, numerical values given to both the transverse axis and the vertical axis on the coordinate planes of FIGS. 12A and 12B do not represent actual lengths.

Also in FIGS. 12A and 12B, in the same manner as in FIGS. 7A and 7B to FIGS. 11A and 11B, a point of application of force to the upper spring seat 22 and a point of application of force to the lower spring seat 24, of the load input axis AA, are respectively represented by $PA_U$ and $PA_L$. Further, a point of application of force to the upper spring seat 22 and a point of application of force to the lower spring seat 24, of the spring reaction axis AR, are respectively represented by $PR_U$ and $PR_L$. Moreover, in FIGS. 12A and 12B, a point of application of force at the upper spring seat 22 and a point of application force at the lower spring seat 24 of the spring reaction axis AR' in the case in which the reference coil spring 36 is assembled to the suspension device 12 are respectively represented by $PR_U'$ and $PR_L'$.

In the same manner as the suspension coil spring 10 in Example 1, the suspension coil spring 10 in Example 2 is also designed on the basis of the reference coil spring 36 (see FIG. 1A) in which the imaginary coil AI is used as a coil axis. However, since the reference coil spring 36 is the coil spring which is designed without controlling the total turns T, a amount of deviation of the points of application of force $PR_U'$ and $PR_L'$ from the points of application of force $PA_U$ and $PA_L$ in the vehicle front and back direction is relatively large and cannot be disregarded. When the reference coil spring 36 is assembled to the suspension device 12 (front suspension), there is a possibility of damaging a straight drive stability of the vehicle.

In Example 2, when the suspension coil spring 10 is designed on the basis of the reference coil spring 36, first, parameters are calculated so as to position the points of application of force $PR_U'$ and $PR_L'$ and the points of application of force $PA_U$ and $PA_L$ coincident with each other along the vehicle transverse direction. In the same manner as in Example 1, among the parameters, fundamental parameters are an upper eccentric amount $V_{U1}$, a lower eccentric amount $V_{L1}$, and an upper eccentric direction $D_{U1}$ of the upper seating surface 32 and a lower eccentric direction $D_{L1}$ of the lower seating surface 34, and a bending point PB as a parameter related to these parameters is also calculated by considering a stress distribution of the suspension coil spring 10 in the compressed state. In order to obtain the upper eccentric amount $V_{U1}$ and the lower eccentric amount $V_{L1}$, and the upper eccentric direction $D_{U1}$ and the lower eccentric direction $D_{L1}$, the coil axis of the reference coil spring 36 is bent into a V shape with the bending point PB as a start point, and as shown in FIG. 12A, the upper point of application of force of the reference coil spring 36 ("intermediate coil spring", hereinafter) moves from $PR_U'$ to $PR_{U1}$ along the vehicle transverse direction, and as shown in FIG. 12B, the lower point of application of force moves from $PR_L'$ to $PR_{L1}$.

The points of application of force $PR_{U1}$ and $PR_{L1}$ of the reference coil spring 36 are theoretically coincident with the points of application of force $PA_U$ and $PA_L$ along the vehicle transverse direction. Therefore, if the reference coil spring 36 is assembled to the suspension device 12, since the spring reaction axis AR and the load input axis AA are coincident with each other, an increase of friction of the shock absorber 14 due to the transverse reaction force WT can be prevented, and a force forcibly acting against another force at the bearing portion 42 of the strut mount 20 can be prevented.

Then, in order to design the suspension coil spring 10 on the basis of the intermediate coil spring, parameters are calculated so as to position the points of application of force $PR_{U1}'$ and $PR_{L1}'$ of the intermediate coil spring coincident with the points of application of force $PA_U$ and $PA_L$ in the vehicle front and back direction. Among the parameters, fundamental parameters are an upper eccentric amount $V_{U2}$ and a lower eccentric amount $V_{L2}$, and an upper eccentric direction $D_{U2}$ of the upper seating surface 32 and a lower eccentric direction $D_{L2}$ of the lower seating surface 34. Basically, a value is defined for a bending point PB, which is the same as that when the intermediate coil spring is designed on the basis of the reference coil spring 36. In order to obtain the upper eccentric amount $V_{U2}$, the lower eccentric amount $V_{L2}$, the upper eccentric direction $D_{U2}$, and the lower eccentric direction $D_{L2}$, with the bending point PB as a starting point, the coil axis of the intermediate coil spring is bent in a direction other than a direction in which the coil axis of the intermediate coil spring is bent for the first time. Therefore, the suspension coil spring 36 is manufactured on the basis of the intermediate coil spring. As shown in FIG. 12A, the upper point of application of force of the reference coil spring 36 moves from $PR_{U1}$ to $PA_U$ along the vehicle transverse direction. As shown in FIG. 12B, the lower point of application of force moves from $PR_{L1}$ to $PA_L$. When the suspension coil spring 10 thus manufactured is assembled to the suspension device 12, a moment around the king pin axis AK (see FIG. 2) can be in a equilibrium state, deterioration of vehicle straight drive stability due to a transverse reaction force of the suspension coil spring 10 can be prevented.

In Example 2, in order to facilitate the explanation of the method of designing the suspension coil spring 36, the description has been made in which the intermediate coil spring is supposed to be an intermediate product during a manufacturing process between the reference coil spring and the suspension coil spring 10. However, the manufacture of the intermediate coil spring is not necessarily required during the actual manufacturing process of the suspension coil spring 10. The intermediate coil spring is conveniently presumed when parameters are calculated when the suspension coil spring is designed.

When the suspension coil spring 10 is manufactured on the basis of the reference coil spring 36, the upper eccentric direction of the suspension coil spring 10 is a direction in which the upper eccentric direction $D_{U1}$ and the upper eccentric direction $D_{U2}$ are composed, and the lower eccentric direction of the suspension coil spring 10 is a direction in which the lower eccentric direction $D_{L1}$ and the lower eccentric direction $D_{L2}$ are composed. Further, the upper eccentric amount and the lower eccentric amount of the suspension coil spring 10 can be considered as a vector amount having a direction and a magnitude. Therefore, as vector amounts, the upper eccentric direction of the suspension coil spring 10 is a direction in which the upper eccentric direction $V_{U1}$ and the upper eccentric direction $V_{U2}$ are combined, and the lower eccentric direction of the suspension coil spring 10 is a direction in which the lower eccentric direction $V_{L1}$ and the lower eccentric direction $V_{L2}$ are combined. Accordingly, when the suspension coil spring 10 is actually manufactured, in order to obtain the combined eccentric amount which is made eccentric in the combined eccentric direction as described above, the coil axis LC is bent into a V shape with the bending point PB as a start point, and the coil spring is turn one time, whereby the suspension coil spring can be manufactured. However, in a case in which the coil axis of the coil spring cannot be bent three-dimensionally because of a constraint of manufacturing facilities or the like, a linear coil axis is bent to obtain the intermediate coil spring, and thereafter, the coil axis of the intermediate coil spring is further bent in another direction, and the suspension coil spring 10 can be manufactured.

Further, in Example 2, parameters are calculated so as to correspond the points of application of force of the coil spring to $PA_U$ and $PA_L$ in the vehicle transverse direction. Thereafter, parameters are calculated so as to correspond the points of application of force of the coil spring to $PA_U$ and $PA_L$ in the vehicle front and back direction. However, on the contrary to this, even when parameters are calculated so as to correspond the points of application of force of the coil spring to $PA_U$ and $PA_L$ in the vehicle front and back direction and then, parameters are calculated so as to correspond the points of application of force of the coil spring to $PA_U$ and $PA_L$ in the vehicle transverse direction, with no problem, the suspension coil spring 10 having the same spring characteristics can be designed.

INDUSTRIAL AVAILABILITY

As described above, the suspension coil spring according to the present invention is suitable for the suspension device in which the spring reaction axis is required to be positioned coincident with or sufficiently close to the load input axis, and the design and the manufacture of the suspension coil spring is facilitated.

The invention claimed is:

1. A method for producing a suspension coil spring interposed between an upper seat (22) and a lower seat (24) in a strut type suspension device for a vehicle by analyzing a spring characteristic by a Finite Element Method (FEM) analysis and designing the spring according to the result of the analysis, in which in the suspension coil spring, when in a free state,
a coil axis (AC) is bent in a V shape at a single bending point (PB),
the single bending point (PB) is coincident with the coil axis (AC) at a portion of the suspension coil spring that corresponds to an end turn portion from a spring terminal for a predetermined number of turns, where the number of turns is a positive real number,
a straight line that intersects the bending point (PB) defines an imaginary coil axis (AI), each of an upper end turn center (CU) and a lower end turn center (CL) intersect the coil axis (AC), and at least one of the upper end turn center (CU) and the lower end center (CL) is made eccentric to a predetermined eccentric amount in a predetermined eccentric direction that is perpendicular to the imaginary coil axis (AI),
an upper end turn portion (32) is set such that an upper seating surface (38) intersects substantially perpendicularly with the imaginary coil axis (AI), and a lower end turn portion (34) is set such that a lower seating surface (40) intersects substantially perpendicularly with the imaginary coil axis (AI),
at least one of the upper seating surface (38) and the lower seating surface (40) does not intersect perpendicularly with the coil axis (AC), and in a compressed state in which the suspension coil spring is interposed between the upper seat (22) and the lower sheet (24) in the suspension device, and the suspension coil spring compressed along a strut axis,
the upper end turn center (CU) and the lower end turn center (CL) are coincident with the imaginary coil axis (AI) and the eccentric direction and the eccentric amount of each of center of the upper end turn portion and the lower end turn portion with respect to the imaginary coil axis (AI) are located at a position where a spring reaction axis (AR) in the suspension device is positioned at a load input axis (AA) to permit operation of the suspension coil spring, the method comprising:

(a) presuming a plurality of patterns of combinations of various values of the upper end eccentric amount and eccentric direction and the lower end eccentric amount and eccentric direction of a suspension coil spring;

(b) setting boundary conditions for the suspension coil spring, and performing the FEM analysis with respect to spring characteristics of each of the patterns of suspension coil springs;

(c) analyzing the respective FEM analysis results and determining a recursive equation expressing a relationship between the upper end eccentric amount and eccentric direction, the lower end eccentric amount and eccentric direction, and the spring characteristics;

(d) inputting required spring characteristics;

(e) calculating an upper end eccentric amount and eccentric direction as well as a lower end eccentric amount and eccentric direction of a suspension coil spring that is expected to satisfy the required spring characteristics according to the recursive equation;

(f) analyzing spring characteristics according to the eccentric amount and eccentric direction of the calculated suspension coil spring with FEM;

(g) deciding whether the analyzed spring characteristics satisfy the required spring characteristics, and repeating the above (a) through (g) until the required spring characteristics are achieved, and (h) fabricating the coil spring in accordance with the FEM analysis.

2. The method for producing a suspension coil spring according to claim 1, wherein, in the recursive equation, variables of each pattern of the suspension coil spring include vectors of the upper end eccentric amount and eccentric directions, and vectors of the lower end eccentric amount and eccentric direction, of each pattern of the suspension coil spring, and variables that indicate spring characteristics include coordinates expressing a required spring reaction axis of the suspension coil spring with respect to a load input axis that is predicted to be generated when the spring is mounted to a vehicle.

3. The method for producing a suspension coil spring according to claim 1 or 2, wherein, a suspension coil spring which can satisfy the required spring characteristics obtained by the FEM analysis is designated according to 9 types of pattern computed for coil springs by varying a vector of the upper end eccentric amount and eccentric direction to be positive, 0, or negative, and simultaneously varying a vector of the lower end eccentric amount and eccentric direction to be positive, 0, or negative, assuming that a reference coil spring has the imaginary coil axis in which the upper end eccentric amount and the lower end eccentric amount are each 0.

* * * * *